United States Patent
Ga et al.

(10) Patent No.: US 11,512,183 B2
(45) Date of Patent: Nov. 29, 2022

(54) CELLULOSE ACETATE COMPOSITION FOR THERMOFORMING, MOLDED ARTICLE, AND METHOD FOR PRODUCING CELLULOSE ACETATE COMPOSITION FOR THERMOFORMING

(71) Applicant: DAICEL CORPORATION, Osaka (JP)

(72) Inventors: Kyokutou Ga, Tokyo (JP); Hiroki Taniguchi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/053,439

(22) PCT Filed: Feb. 15, 2019

(86) PCT No.: PCT/JP2019/005553
§ 371 (c)(1),
(2) Date: Nov. 6, 2020

(87) PCT Pub. No.: WO2020/035964
PCT Pub. Date: Feb. 20, 2020

(65) Prior Publication Data
US 2021/0380782 A1    Dec. 9, 2021

(30) Foreign Application Priority Data

Aug. 14, 2018 (WO) .................. PCT/JP2018/030264

(51) Int. Cl.
*C08L 1/12* (2006.01)
*B29C 51/00* (2006.01)
(Continued)

(52) U.S. Cl.
CPC .............. *C08L 1/12* (2013.01); *B29C 51/002* (2013.01); *C08K 5/11* (2013.01); *B29K 2001/12* (2013.01)

(58) Field of Classification Search
CPC ........................................................ C08L 1/12
See application file for complete search history.

(56) References Cited

U.S. PATENT DOCUMENTS

2012/0103352 A1   5/2012 Taniguchi et al.
2016/0333500 A1   11/2016 Shimamoto et al.

FOREIGN PATENT DOCUMENTS

CN   102551208 A   7/2012
CN   105917038 A   8/2016
(Continued)

OTHER PUBLICATIONS

Tezuka, Y. and Y. Tsuchiya, "Determination of substituent distrubution in cellulose acetate by means of a $^{13}$C NMR study on its propanoated derivative," Carbohydrate Research (1995), vol. 273, pp. 83-91.

(Continued)

*Primary Examiner* — Arrie L Reuther
(74) *Attorney, Agent, or Firm* — Birch, Stewart, Kolasch & Birch, LLP

(57) ABSTRACT

An object of the present invention is to provide a cellulose acetate composition for thermoforming with excellent biodegradability and excellent thermoformability. A cellulose acetate composition for thermoforming containing a cellulose acetate and a glycerin ester-based plasticizer, wherein the cellulose acetate has a degree of acetyl substitution of 1.4 or greater and 2.0 or less, a compositional distribution index (CDI) of 4.0 or less, and a total sulfur content of 15 mg/kg or greater and less than 150 mg/kg.

16 Claims, 3 Drawing Sheets

(51) Int. Cl.
*C08K 5/11* (2006.01)
*B29K 1/00* (2006.01)

(56) References Cited

FOREIGN PATENT DOCUMENTS

| | | |
|---|---|---|
| EP | 3 023 014 A1 | 5/2016 |
| JP | 7-76632 A | 3/1995 |
| JP | 2000-219776 A | 8/2000 |
| JP | 2002-30182 A | 1/2002 |
| JP | 2003-201301 A | 7/2003 |
| JP | 2015-503335 A | 2/2015 |
| JP | 2015-140432 A | 8/2015 |
| WO | WO 2013/098405 A2 | 7/2013 |
| WO | WO 2015/194186 A1 | 12/2015 |

OTHER PUBLICATIONS

Indian Office Action, dated May 31, 2021, for Indian Application No. 202047021248, with an English translation.

Scholtens et al., "Fecal Secretory Immunoglobulin A Is Increased in Healthy Infants Who Receive a Formula with Short-Chain Galacto-Oligosaccharides and Long-Chain Fructo-Oligosaccharides," Journal of Nutrition, vol. 138, No. 6, 2008 (Jun. 2008), pp. 1141-1147 (total 8 pages).

Chinese Office Action and Search Report for Chinese Application No. 201980039075.1, dated Dec. 2, 2021, with English translation.

Supplementary European Search Report issued in Application No. 19850382.3 dated Apr. 26, 2022.

Clement, L. and C. Riviere, Bull. Soc. Chim. (1934), vol. 5, No. 1, p. 1075.

Miyamoto, T., Cellulose as Materials of Functional Polymers, Journal of the Society of Fiber Science and Technology (1986), vol. 42, p. 25.

Rosenthal, A. J. and B. B. White, "Franctionation of Cellulose Acetate," Industrial and Engineering Chemistry (Nov. 1952), vol. 44, No. 11, pp. 2693-2696.

Snookne et al., "Fractionation of Cellulose Acetate," U.S. Department of Commerce, National Bureau of Standards, Research Paper RP1490, pp. 123-130, Aug. 1942.

Tezuka, Y. and Y. Tsuchiya, "Determination of substituent distrubution in cellulose acetate by means of a $^{13}C$ NMR study on its propanoated derivative," Carbohydrate Research (1995), vol. 273, p. 83-91.

CELLULOSE ACETATE COMPOSITION FOR THERMOFORMING, MOLDED ARTICLE, AND METHOD FOR PRODUCING CELLULOSE ACETATE COMPOSITION FOR THERMOFORMING

TECHNICAL FIELD

The present invention relates to a cellulose acetate composition for thermoforming, a molded article, and a method for producing a cellulose acetate composition for thermoforming.

BACKGROUND ART

In recent years, there has been an increased demand for Reduced Risk Products that do not use fire. Reduced Risk Products are generally divided into two types: with one type (an e-cigarette), a solution that contains nicotine dissolved in an organic solvent is heated and the resulting aerosol or gas is inhaled by a user; and with another type (a heated tobacco product), tobacco leaves (the tobacco leaves including artificial tobacco leaves such as processed tobacco leaves or substrates impregnated with a tobacco component) are heated (but not burned) and then the diffusing nicotine-containing aerosol is inhaled by a user. However, in Japan, nicotine itself is designated as a pharmaceutical product, and the handling of nicotine is regulated. For example, the sale of nicotine is prohibited, in principle. In such cases, the e-cigarette, with which a solution that contains nicotine dissolved in an organic solvent is heated and the resulting aerosol or gas is inhaled, cannot be sold. Further, the e-cigarette is designated as a pharmaceutical product also in many countries besides Japan. Note that iQOS (trade name), available from Philip Morris International Inc., is a heated tobacco product with which tobacco leaves of a dedicated cigarette are heated and then the diffusing nicotine-containing aerosol is inhaled by a user.

Patent Document 1 describes, as an example of a cigarette for use in a heated tobacco product, one having a structure in which a mouthpiece, an aerosol-cooling element, a support element, and an aerosol-forming substrate are arranged in this order from a side close to a mouth-end, and also describes that the cigarette includes a cellulose acetate tow filter as the mouthpiece, a polylactic acid sheet as the aerosol-cooling element, a hollow cellulose acetate tube as the support element, and tobacco as the aerosol-forming substrate.

In the case of heated tobacco products in which tobacco leaves is heated, members other than the tobacco leaves of a dedicated cigarette remain after smoking is finished. Thus, environment issues can arise due to the remaining members being thrown away. To address the environment issues, a biodegradable polylactic acid is used as a material for a cooling part of the cigarette for use in a heated tobacco product, as described above.

From the perspective of excellent biodegradability, in general, cellulose acetates that are used in cellulose acetate tow filters and cellulose acetate tubes preferably have a lower degree of acetyl substitution, but must have a certain degree of acetyl substitution because of ease of processing by thermoforming and less influences on the taste. Furthermore, additives such as a plasticizer may be added to a cellulose acetate for the purpose of achieving superior thermoformability and physical properties (Patent Document 2 to 6).

CITATION LIST

Patent Document

Patent Document 1: JP 2015-503335 A
Patent Document 2: JP H07-076632 A
Patent Document 3: JP 2002-030182 A
Patent Document 4: WO 2015/194186
Patent Document 5: JP 2015-140432 A
Patent Document 6: JP 2000-219776 A

SUMMARY OF INVENTION

Technical Problem

As described in Patent Document 2, a phthalic acid ester may be used as a plasticizer to be typically added to a cellulose acetate. However, phthalic acid esters release strong irritating odors during heat processing such as thermoforming. Also, they are strongly suspected of being endocrine disruptors (in other words, "environmental hormones"), and invite a concern about harmfulness to the human body and a large load on environments. In particular, when a phthalic acid ester is added during processing of known tobacco filters and the respective members of heated tobacco products (smoking-related members including a member for use in a mouth-end such as a cellulose acetate tow filter, a member as an aerosol-cooling element, and a member as a support element such as a hollow cellulose acetate tube), there is a concern about harmfulness to the human body and influences on the taste.

Patent Document 3 describes a cellulose acetate having a degree of acetyl substitution ranging from 1.9 to 2.6, and Patent Document 4 describes a cellulose acetate having a degree of substitution of 2.5. However, cellulose acetates having a degree of acetyl substitution of greater than 2.0 (e.g., ranging from 2.1 to 2.6) do not have excellent biodegradability.

As described in Patent Document 5, polyethylene glycol may be used as a plasticizer to be added to a cellulose acetate having a degree of acetyl substitution ranging from 0.5 to 1.0. However, in particular, addition of polyethylene glycol during processing of known tobacco filters and the respective members of heated tobacco products arouses a concern about influences on the taste. When polyethylene glycol is used as a plasticizer to be added to a cellulose acetate having a degree of acetyl substitution ranging from 1.4 to 1.8, the thermoformability imparted to the cellulose acetate by the polyethylene glycol is not satisfactory. Furthermore, depending on the difference in degree of polymerization, the polyethylene glycol may be in a liquid form in the case of a low degree of polymerization and in a solid form in the case of a high degree of polymerization, at room temperature. A liquid-form polyethylene glycol is preferred because of being easily dispersed uniformly in a cellulose acetate, but the liquid-form polyethylene glycol easily bleeds out from the cellulose acetate. A solid-form polyethylene glycol, on the other hand, arouses a concern about difficulty in uniformly dispersing in a cellulose acetate. Thus, it is not substantially easy to handle the polyethylene glycol as a plasticizer for cellulose acetates.

As described in Patent Document 6, in the production of a resin composition containing a cellulose acetate having a combined acetic acid ranging from 34 to 47 wt. % and a biodegradable plasticizer, a mixture containing 13 wt. % of dissolving pulp, 2 wt. % of sulfuric acid, 35 wt. % of an acetic anhydride, and 50 wt. % of glacial acetic acid is acetylated at 36° C. for 3 hours, and, after the reaction, the reaction product is neutralized with potassium acetate, and then hydrolyzed (Examples). However, the acetylation reaction is likely to proceed because sulfuric acid is used in a large amount relative to the dissolving pulp in the acetylation, but also increases the amount of bound sulfuric acid in the resulting cellulose acetate. The sulfate bound to the cellulose acetate becomes a salt by neutralization after the acetylation, and therefore stabilizes and becomes difficult to hydrolyze. Therefore, prolonged hydrolysis is required after the acetylation. As a result, the obtained cellulose acetates are nonuniform and vary in degree of acetyl substitution, and resin compositions formed from such a cellulose acetate and a plasticizer become cloudy and/or contain residual unmelted substances, and have insufficient thermoformability and processability.

Methods of adding a known plasticizer can increase the thermoformability of cellulose acetates to some extent, but cannot achieve both the biodegradability and sufficient thermoformability of the resulting cellulose acetate compositions. An object of the present invention is to provide a cellulose acetate composition for thermoforming, which has excellent biodegradability, is less cloudy, contains less residual unmelted substances, and has excellent thermoformability.

Solution to Problem

A first aspect of the present invention relates to a cellulose acetate composition for thermoforming containing a cellulose acetate and a glycerin ester-based plasticizer, wherein the cellulose acetate has a degree of acetyl substitution of 1.4 or greater and 2.0 or less, a compositional distribution index (CDI), as defined below, of 4.0 or less, and a total sulfur content of 15 mg/kg or greater and less than 150 mg/kg:

CDI=(Measured value of half-height width of compositional distribution)/(Theoretical value of half-height width of compositional distribution)

wherein the measured value of a half-height width of compositional distribution is a half-height width of compositional distribution determined by HPLC analysis of cellulose acetate propionate obtained by propionylating all residual hydroxyl groups of cellulose acetate (sample); and the theoretical value of a half-height width of compositional distribution is defined by:

Theoretical value of half-height width of compositional distribution = $2.35482\sqrt{3*DPw*(DS/3)*(1-DS/3)}/DPw$ [Equation 1]

where DS represents a degree of acetyl substitution; and

DPw represents a weight average degree of polymerization (a value determined by GPC-light scattering method using cellulose acetate propionate obtained by propionylating all residual hydroxyl groups of cellulose acetate (sample)).

In the cellulose acetate composition for thermoforming, a content of the glycerin ester-based plasticizer may be 5 parts by weight or greater and 40 parts by weight or less, per 100 parts by weight of the total amount of the cellulose acetate and the glycerin ester-based plasticizer.

In the cellulose acetate composition for thermoforming, the glycerin ester-based plasticizer may be an ester compound of glycerin and acetic acid.

In the cellulose acetate composition for thermoforming, the glycerin ester-based plasticizer may be triacetin.

In the cellulose acetate composition for thermoforming, the cellulose acetate may have a degree of acetyl substitution of 1.4 or greater and 1.8 or less.

A second aspect of the present invention relates to a molded article formed by molding the cellulose acetate composition for thermoforming.

The molded article may be a film.

The molded article may have a hollow cylindrical shape.

The molded article may be a cigarette member of a heated tobacco product.

A third aspect of the present invention relates to a method for producing a cellulose acetate composition for thermoforming, including:

dispersing or dissolving a glycerin ester-based plasticizer in a dispersion medium or a solvent to prepare a dispersion or a solution;

mixing the dispersion or the solution with a cellulose acetate; and vaporizing the dispersion medium or the solvent from a mixture obtained by the mixing, wherein the cellulose acetate has a degree of acetyl substitution of 1.4 or greater and 2.0 or less, a compositional distribution index (CDI), as defined above, of 4.0 or less, and a total sulfur content of 15 mg/kg or greater and less than 150 mg/kg.

In the method for producing a cellulose acetate composition for thermoforming, the dispersion medium or the solvent may be water, ethanol, or a mixed solution of water and ethanol.

In the method for producing a cellulose acetate composition for thermoforming, a content of the glycerin ester-based plasticizer may be 5 parts by weight or greater and 40 parts by weight or less, per 100 parts by weight of the total amount of the cellulose acetate and the glycerin ester-based plasticizer.

In the method for producing a cellulose acetate composition for thermoforming, the cellulose acetate may have a degree of acetyl substitution of 1.4 or greater and 1.8 or less.

Advantageous Effects of Invention

The present invention can provide a cellulose acetate composition for thermoforming, which has excellent biodegradability, is less cloudy, contains less residual unmelted substances, and has excellent thermoformability.

DESCRIPTION OF EMBODIMENTS

[Cellulose Acetate Composition for Thermoforming]

Figure 1:
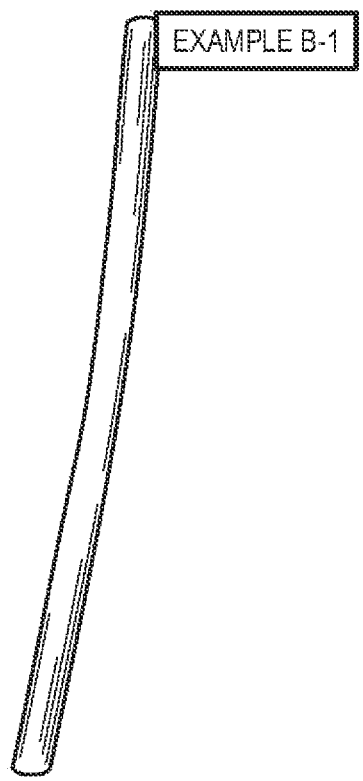
FIG. 1 is an explanatory diagram illustrating an example of a state of a cellulose acetate composition after heat processing (extrusion).

The cellulose acetate composition for thermoforming of the present disclosure contains a cellulose acetate having a degree of acetyl substitution of 1.4 or greater and 2.0 or less and a glycerin ester-based plasticizer.

Cellulose Acetate
(Degree of Acetyl Substitution)

The cellulose acetate included in the cellulose acetate composition for thermoforming of the present disclosure has a degree of acetyl substitution of 1.4 or greater and 2.0 or less, preferably 1.4 or greater and 1.8 or less, more preferably 1.5 or greater and 1.8 or less, and more preferably 1.6 or greater and 1.8 or less. When the degree of acetyl substitution falls within this range, the cellulose acetate composition for thermoforming has not only excellent biodegradability, but also excellent thermoformability. Furthermore, the cellulose acetate composition for thermoforming of the present disclosure also has water resistance required when used as a tobacco member, especially, as a member for use in a mouth-end such as a cellulose acetate tow filter.

The excellent thermoformability specifically means, for example, that the melt state of a melt can be adjusted to a range suitable for thermoforming, i.e., the melting viscosity of the melt can be adjusted to a range suitable for thermoforming to achieve uniform melting. The obtained cellulose acetate composition has excellent thermoformability, and thus is less cloudy and contains less residual unmelted substances.

In the present disclosure, the thermoforming means an operation of heating a material to induce its plasticity at such a level that the material can be deformed, and cooling the material to form the material into a predetermined shape, and examples of thermoforming methods include heat compression molding, extrusion molding, and injection molding.

The unmelted substances are solid matters that remain unmelted even by heating, and, mainly, include cellulose acetates having a diameter from 0.5 mm to 2 mm. Cloudiness or turbidity is caused by spread of unmelted substances which are so minute that the shape of solid products is invisible to the naked eye. Alternatively, cloudiness or turbidity is caused by occurrence of "shark skin" phenomenon on the resin surface (a phenomenon in which the surface is finely roughened).

On the other hand, when the degree of acetyl substitution is less than 1.4, the obtained cellulose acetate composition has poor thermoformability and also higher water solubility or water adsorption, and, consequently, tends to have inferior durability as a molded article. In the case where the cellulose acetate composition is used as a tobacco member, in particular, a member for use in a mouth-end such as a cellulose acetate tow filter, its high water solubility or water adsorption tends to adversely affect the taste. In addition, when the degree of acetyl substitution exceeds 2.0, the cellulose acetate composition may not achieve good biodegradability.

The degree of acetyl substitution of the cellulose acetate can be measured by a known titration method in which a cellulose acetate is dissolved in an appropriate solvent according to the degree of substitution and the degree of substitution of the cellulose acetate is determined. The degree of acetyl substitution can also be measured by NMR according to the Tezuka's method (Tezuka, Carbonydr. Res. 273, 83 (1995)) involving converting hydroxyl groups of a cellulose acetate into completely-derivatized cellulose acetate propionate (CAP), and then dissolving the cellulose acetate propionate in deuterated chloroform.

Furthermore, the degree of acetyl substitution is determined by measuring a combined acetic acid according to the method for measuring the combined acetic acid in ASTM: D-817-91 (Testing methods for cellulose acetate, etc.) and converting the measured combined acetic acid according to the following equation. This is the most common procedure to determine the degree of substitution of cellulose acetate.

$$DS = 162.14 \times AV \times 0.01 / (60.052 - 42.037 \times AV \times 0.01)$$

where DS represents a degree of acetyl substitution; and
AV represents a combined acetic acid (%)

First, 500 mg of a dried cellulose acetate (sample) is precisely weighed and dissolved in 50 ml of a mixed solvent of ultrapure water and acetone (volume ratio: 4:1), and then 50 ml of a 0.2 N aqueous sodium hydroxide solution is added to saponify the cellulose acetate at 25° C. for 2 hours. Next, 50 ml of 0.2 N hydrochloric acid is added, and an amount of acetic acid released is titrated with a 0.2 N aqueous sodium hydroxide solution (0.2 N normal sodium hydroxide solution) using phenolphthalein as an indicator. Also, a blank test (test without using any sample) is performed by the same method. AV (combined acetic acid) (%) is then calculated according to the following equation:

$$AV\ (\%) = (A-B) \times F \times 1.201 / \text{sample weight(g)}$$

wherein
A represents a titration volume (ml) of 0.2 N normal sodium hydroxide solution;
B represents a titration volume (ml) of 0.2 N normal sodium hydroxide solution in blank test; and
F: factor of 0.2 N normal sodium hydroxide solution.

In the present disclosure, the degree of acetyl substitution can be referred to also as a total degree of acetyl substitution, i.e., a sum of average degrees of acetyl substitution at the 2-, 3-, and 6-positions of the glucose ring of the cellulose acetate.

(Compositional Distribution Index (CDI))

The cellulose acetate included in the cellulose acetate composition for thermoforming of the present disclosure has a compositional distribution index (CDI) of 4.0 or less (e.g., ranging from 1.0 to 4.0). The compositional distribution index (CDI) is preferably 3.0 or less, 2.8 or less, 2.0 or less, 1.8 or less, 1.6 or less, and even 1.3 or less. The lower limit value is not particularly limited, but may be 1.0 or greater. The cellulose acetate has a small compositional distribution index (CDI) and a uniform compositional distribution (intermolecular substitution degree distribution), and thus the cellulose acetate composition for thermoforming of the present disclosure has superior thermoformability.

When the compositional distribution index (CDI) exceeds 4.0, the cellulose acetate varies in degree of acetyl substitution and is nonuniform. Therefore, a resin composition formed from such a cellulose acetate and a plasticizer is less likely to be uniformly melted by heat and has poor meltability. Thus, the resulting cellulose acetate composition may become turbid, for example, cloudy, and/or may contain residual unmelted substances. Thus, such a cellulose acetate composition is not suitable for thermoforming.

When calculated, the lower limit of the compositional distribution index (CDI) is 0. This is achieved with special synthetic techniques such as a technique in which only the 6-position of the glucose residue is acetylated with a selectivity of 100% while no other position is acetylated. However, such synthesis techniques have not yet been known. In a situation where all the hydroxyl groups of the glucose residue are acetylated and deacetylated with the same probability, the CDI will be 1.0. However, considerable ingenuity is required to realize a compositional distribution close to such an ideal state in an actual cellulose reaction. In the prior art, not so much attention has been paid to such control of compositional distribution.

Here, the compositional distribution index (CDI) is defined as a ratio of the measured value of a half-height width of compositional distribution to the theoretical value of the half-height width of compositional distribution [(Measured value of half-height width of compositional distribution)/(Theoretical value of half-height width of compositional distribution]. The half-height width of compositional distribution is referred to also as "half-height width of intermolecular substitution degree distribution" or referred to simply as "half-height width of substitution degree distribution".

To evaluate the uniformity of the degree of acetyl substitution of a cellulose acetate, the magnitude of a half-height width of a maximum peak in an intermolecular substitution degree distribution curve of the cellulose acetate can be used as an indicator. The half-height width is a width of a peak at a half-height of the peak in the chart, when the abscissa axis (x-axis) represents a degree of acetyl substitution and the ordinate axis (y-axis) represents an abundance at this degree of substitution. Also, the half-height width is an index as a measure of the dispersion in the distribution. The half-height width of compositional distribution (half-height width of substitution degree distribution) can be determined by high performance liquid chromatography (HPLC) analysis. A method of converting the abscissa axis (elution time) in an elution curve of a cellulose ester in HPLC into a degree of substitution (from 0 to 3) is described in JP 2003-201301 A (paragraphs [0037] to [0040]).

(Theoretical Value of Half-Height Width of Compositional Distribution)

The theoretical value of the half-height width of compositional distribution (half-height width of substitution degree distribution) can be calculated stochastically. That is, the theoretical value of the half-height width of compositional distribution is determined according to Equation (1) below:

[Equation 2]

$$\text{Theoretical value of half-height width of compositional distribution} = 2.35482\sqrt{mpq/DPw} \quad (1)$$

where
m is a total number of hydroxyl groups and acetyl groups in one molecule of cellulose acetate;
p is a probability of acetyl substitution of hydroxyl groups in one molecule of cellulose acetate;
q=1−p; and
DPw represents a weight average degree of polymerization (a value determined by GPC-light scattering method using cellulose acetate propionate obtained by propionylating all residual hydroxyl groups of cellulose acetate).

Furthermore, the theoretical value of the half-height width of compositional distribution is expressed by the degree of substitution and the degree of polymerization as follows. Equation (2) below is a definition equation for determining the theoretical value of the half-height width of compositional distribution:

[Equation 3]

$$\text{Theoretical value of half-height width of compositional distribution} = \quad (2)$$
$$2.35482\sqrt{3*DPw*(DS/3)*(1-DS/3)}/DPw$$

where DS represents a degree of acetyl substitution; and
DPw represents a weight average degree of polymerization (a value determined by GPC-light scattering method using cellulose acetate propionate obtained by propionylating all residual hydroxyl groups of cellulose acetate).

More strictly, for Equations (1) and (2), the polymerization degree distribution should be taken into consideration. In this case, the "DPw" in Equations (1) and (2) should be replaced with the function of the polymerization degree distribution, and the entire equations should be integrated from a degree of polymerization of 0 to infinity. However, Equations (1) and (2) give a theoretical value with an approximately sufficient precision, as long as they employ DPw. In a case where DPn (number average degree of polymerization) is employed, the effect of the polymerization degree distribution would not be negligible. So, DPw should be employed.

(Measured Value of Half-Height Width of Compositional Distribution)

In the present disclosure, the measured value of the half-height width of compositional distribution is a half-height width of compositional distribution determined by HPLC analysis of a cellulose acetate propionate obtained by propionylating all residual hydroxyl groups (unsubstituted hydroxyl groups) of a cellulose acetate (sample).

In general, high performance liquid chromatography (HPLC) analysis can be performed on a cellulose acetate having a degree of acetyl substitution ranging from 2 to 3 without pretreatment, and thus the half-height width of compositional distribution can be determined. For example, JP 2011-158664 A describes a compositional distribution analysis method for a cellulose acetate having a degree of substitution from 2.27 to 2.56.

On the other hand, the measured value of the half-height width of compositional distribution (half-height width of substitution degree distribution) is determined by derivatizing residual hydroxyl groups in the molecule of the cellulose acetate as a pretreatment prior to HPLC analysis, and then performing the HPLC analysis. The purpose of this pretreatment is to convert the cellulose acetate having a low degree of substitution into a derivative that is easily dissolved in an organic solvent to enable the HPLC analysis. That is, the residual hydroxyl groups in the molecule are completely propionylated, and the completely-derivatized cellulose acetate propionate (CAP) is subjected to the HPLC analysis to determine the half-height width of compositional distribution (measured value). The derivatization should be completely performed, and, therefore, no residual hydroxyl group is present in the molecule and only the acetyl groups and propionyl groups are present in the molecule. That is, the sum of the degree of acetyl substitution (DSac) and the degree of propionyl substitution (DSpr) is 3. This is because the relational expression: DSac+DSpr=3 is used to create a calibration curve to convert the abscissa axis (elution time) of the HPLC elution curve of the CAP into a degree of acetyl substitution (from 0 to 3).

The complete derivatization of a cellulose acetate can be accomplished by allowing a propionic anhydride to act on the cellulose acetate using N,N-dimethylaminopyridine as a catalyst in a pyridine/N,N-dimethylacetamide mixed solvent. More specifically, propionylation is performed under the following conditions: a temperature of 100° C. and a reaction time from 1.5 to 3.0 hours, using a mixed solvent [pyridine/N,N-dimethylacetamide=1/1 (v/v)] as a solvent in an amount of 20 parts by weight relative to a cellulose acetate (sample), a propionic anhydride as a propionylating agent in an amount from 6.0 to 7.5 equivalents relative to hydroxyl groups of the cellulose acetate, and N,N-dimethylaminopyridine as a catalyst in an amount from 6.5 to 8.0 mol % relative to the hydroxyl groups of the cellulose acetate. Then, after the reaction, the reaction mixture is subjected to precipitation using methanol as a precipitation solvent to yield a completely-derivatized cellulose acetate propionate. More specifically, the completely-derivatized cellulose acetate propionate (CAP) can be obtained by, for example, charging 1 part by weight of the reaction mixture into 10 parts by weight of methanol to perform precipitation, washing the resulting precipitates with methanol five times, and vacuum-drying the precipitates at 60° C. for 3 hours. Note that the weight average degree of polymerization (DPw) is also measured by converting the cellulose acetate (sample) into a completely-derivatized cellulose acetate propionate (CAP) by this method.

In the HPLC analysis described above, a plurality of cellulose acetate propionates having different degrees of acetyl substitutions are used as standard samples to perform HPLC analysis using a predetermined measurement apparatus under measurement conditions; the analytical values of these standard samples are used to create a calibration curve [a curve indicating the relationship between the elution time and the degree of acetyl substitution (from 0 to 3) of cellulose acetate propionates, normally, a cubic curve]; and the half height width of chemical composition (measured value) of the cellulose acetate (sample) can be determined from the calibration curve. The HPLC analysis above can determine the relationship between the elution time and the acetyl substitution degree distribution of cellulose acetate propionates. This is the relationship between the elution time and the acetyl substitution degree distribution of a substance in which all the residual hydroxyl groups in the sample molecule have been converted into propionyloxy groups. Therefore, the determination is, essentially, not different from the determination of the acetyl substitution degree distribution of the cellulose acetate of the present disclosure.

The conditions for the HPLC analysis are as follows.
Apparatus: Agilent 1100 Series
Column: Waters Nova-Pak Phenyl 60 Å 4 μm (150 mm×3.9 mm Φ)+guard column
Column temperature: 30° C.
Detection: Varian 380-LC
Injection volume: 5.0 μL (sample concentration: 0.1% (wt/vol))
Eluents: Eluent A: MeOH/H$_2$O=8/1 (v/v), Eluent B: CHCl$_3$/MeOH=8/1 (v/v)
Gradient: A/B=80/20→0/100 (28 min.); Flow rate: 0.7 mL/min.

In the substitution degree distribution curve determined from the calibration curve [substitution degree distribution curve of the cellulose acetate propionate, with the abundance of the cellulose acetate propionate on the ordinate axis and the degree of acetyl substitution on the abscissa axis] (referred to also as "intermolecular substitution degree distribution curve"), the half-height width of substitution degree distribution is determined, on a maximum peak (E) corresponding to the average degree of substitution, as follows. A base line (A-B) tangent to a base (A) on a low substitution degree side of the peak (E) and a base (B) on a high substitution degree side thereof is drawn, and a perpendicular line is drawn from the maximum peak (E) toward the abscissa axis, with respect to the base line. An intersection (C) between the perpendicular line and the base line (A-B) is determined, and a midpoint (D) between the maximum peak (E) and the intersection (C) is determined. A straight line parallel to the base line (A-B) is drawn through the midpoint (D) to determine two intersections (A', B') with the intermolecular substitution degree distribution curve. Perpendicular lines are drawn from the two intersections (A', B') to the abscissa axis, and a width between the two intersections on the abscissa axis is taken as the half-height width of maximum peak (i.e., half-height width of substitution degree distribution).

Such a half-height width of substitution degree distribution reflects the fact that the retention times of the molecular chains of cellulose acetate propionates in the sample are different depending on the level of acetylation of hydroxyl groups of glucose rings of individual polymer chains constituting the molecular chains of the cellulose acetate propionates. Ideally, the width of retention time indicates the width of compositional distribution (in the substitution degree unit). However, in HPLC, a tube part that does not contribute to the distribution (such as a guide column for protecting a column) exists. Therefore, due to the configuration of the measurement apparatus, the width of retention time that is caused not by the width of compositional distribution is often included as an error. This error is affected by the length and inner diameter of the column, the length and routing of piping from the column to the detector, etc., and varies dependent on the device configuration, as described above. Therefore, the half-height width of substitution degree distribution of the cellulose acetate propionate can normally be determined as corrected value Z based on a correction formula represented by the following formula. Using such a correction formula, it is possible to determine a more accurate half-height width of substitution degree distribution (measured value) as the same (almost the same) value even if different measurement apparatuses (and measurement conditions) are used.

$$Z=(X^2-Y^2)^{1/2}$$

where X represents a half-height width of substitution degree distribution (uncorrected value) determined by a predetermined measurement apparatus under predetermined measurement conditions; and Y=(a−b)x/3+b (0≤x≤3) where "a" represents an apparent half-height width of substitution degree distribution of a cellulose acetate with a degree of substitution of 3 determined by the same measurement apparatus under the same measurement conditions as those for the X described above (in fact, no substitution degree distribution exists because the degree of substitution is 3); and b represents an apparent half-height width of substitution degree distribution of a cellulose propionate with a degree of substitution of 3 determined by the same measurement apparatus under the same measurement conditions as those for the X described above; and x represents a degree of acetyl substitution of the measurement sample (0≤x≤3).

Note that the cellulose acetate (or cellulose propionate) with a degree of substitution of 3 refers to a cellulose ester in which all the hydroxyl groups of the cellulose are esterified, and, in fact, which does not have (ideally) a half-height width of substitution degree distribution (i.e., a half-height width of substitution degree distribution of 0).

The above-described theoretical formula of substitution degree distribution gives a stochastically calculated value on the assumption that all acetylation and deacetylation proceed independently and evenly. That is, it gives a calculated value according to a binomial distribution. Such an ideal situation cannot occur, realistically. Considerable ingenuity is required to realize the hydrolysis reaction of the cellulose acetate close to an ideal random reaction and/or fractionation in the composition in post-treatment after the reaction. Otherwise, the substitution degree distribution of the cellulose ester is significantly wider than that stochastically determined according to the binomial distribution.

One possible particular approach to such a reaction is to maintain the system under conditions in which deacetylation and acetylation are in equilibrium, for example. However, in this case, cellulose decomposition progresses due to an acid catalyst, which is not preferable. Another possible approach to such a reaction is to employ reaction conditions under which the deacetylation rate is slow for cellulose esters having a low degree of substitution. However, such a specific method has not yet been known. That is, there is no known particular approach for the reaction to control the substitution degree distribution of the cellulose ester according to the binomial distribution, as per reaction probability theories. Furthermore, various circumstances, such as non-uniformity of the acetylation process (cellulose acetylation) and occurrence of partial or temporary precipitation due to water that is added stepwise during the aging process (cellulose acetate hydrolysis), cause the substitution degree distribution to be wider than the binominal distribution. It is realistically impossible to avoid all of them and realize ideal conditions. This resembles the fact that an ideal gas is just an ideal product and that an actually existing gas behaves, more or less, differently from the ideal gas.

In the known synthesis and post-treatment of a cellulose acetate having a low degree of substitution, little attention has been paid to such problems of the substitution degree distribution, and the substitution degree distribution has not been measured, verified or considered. For example, the literature (Journal of the Society of Fiber Science and Technology, 42, p. 25 (1986)) argues that the solubility of a cellulose acetate with a low degree of substitution is determined by the distribution of acetyl groups to the 2-, 3-, and 6-positions of glucose residue, and gives no consideration for the compositional distribution.

According to the present disclosure, surprisingly, the substitution degree distribution of a cellulose acetate can be controlled by an approach for post-treatment conditions after the hydrolysis of the cellulose acetate, as will be described below. The literatures (CiBment, L., and Rivibre, C., Bull. SOC. chim., (5) 1, 1075 (1934); Sookne, A. M., Rutherford, H. A., Mark, H., and Harris, M. J., Research Natl. Bur. Standards, 29, 123 (1942); and A. J. Rosenthal, B. B. White, Ind. Eng. Chem., 1952, 44 (11), pp. 2693-2696) describe that, in the precipitation fractionation of a cellulose acetate having a degree of substitution of 2.3, molecular weight-dependent fractionation and slight fractionation associated with the degree of substitution (chemical composition) occur, and do not report that the degree of substitution (chemical composition) can provide significant fractionation, as disclosed herein. Furthermore, it has not been verified that the substitution degree distribution (chemical composition) of a cellulose acetate having a low degree of substitution can be controlled by dissolution fractionation or precipitation fractionation, as in the present disclosure.

Another approach to narrow the substitution degree distribution found by the present inventors is a hydrolysis reaction (aging reaction) of a cellulose acetate at a high temperature of 90° C. or higher (or higher than 90° C.). In the prior art, the details of the degree of polymerization of a product obtained through a high temperature reaction have not been analyzed or considered. Nevertheless, it has been said that cellulose decomposition preferentially occurs in a high temperature reaction at 90° C. or higher. This idea can be said to be an assumption (stereotype) based solely on the consideration for viscosity. The present inventors have found that, when a cellulose acetate is hydrolyzed to give a cellulose acetate with a low degree of substitution, the cellulose acetate is reacted in a large amount of acetic acid at a high temperature of 90° C. or higher (or higher than 90° C.) preferably in the presence of a strong acid such as sulfuric acid, and thus that the cellulose acetate does not show a reduction in degree of polymerization, but shows a reduction in viscosity together with a reduction in CDI. That is, the present inventors have elucidated that the reduction in viscosity associated with the high temperature reaction is caused not by the reduction in degree of polymerization, but by the reduction in structural viscosity due to a narrow substitution degree distribution. When a cellulose acetate is hydrolyzed under the conditions described above, not only a forward reaction, but also a reverse reaction occurs. So, the CDI of the product (cellulose acetate with a low degree of substitution) is a very small value. When the cellulose acetate is used to form a cellulose acetate composition for thermoforming, the melt state is stable (in other words, the melting viscosity of the melt can be adjusted within a range suitable for thermoforming to achieve uniform melting thereof), and particularly excellent thermoformability can be achieved. In contrast, when the cellulose acetate is hydrolyzed under conditions in which the reverse reaction is unlikely to occur, the substitution degree distribution becomes wider due to various factors. When the cellulose acetate is used to form a cellulose acetate composition for thermoforming, the melt state is likely to be unstable, i.e., a portion that is not melted may remain, and good thermoformability may not be obtained.

(Weight Average Degree of Polymerization (DPw))

The weight average degree of polymerization (DPw) is a value determined by a GPC-light scattering method using a cellulose acetate propionate obtained by propionylating all residual hydroxyl groups of the cellulose acetate (sample).

The weight average degree of polymerization (DPw) of the cellulose acetate of the present disclosure is preferably in the range from 100 to 1000. When the weight average degree of polymerization (DPw) is too low, the thermoformability tends to be inferior. When the weight average degree of polymerization (DPw) is too high, the biodegradability tends to be inferior. The weight average degree of polymerization (DPw) is preferably from 100 to 800, and more preferably from 200 to 700.

The weight average degree of polymerization (DPw) is determined by converting a cellulose acetate (sample) into a completely-derivatized cellulose acetate propionate (CAP) by a method similar to that employed when determining the measured value of the half-height width of compositional distribution, and then subjecting the completely-derivatized cellulose acetate propionate (CAP) to size exclusion chromatography analysis (GPC-light scattering method).

As described above, the degree of polymerization (molecular weight) of the cellulose acetate is measured by the GPC-light scattering method (GPC-MALLS, GPC-LALLS, etc.). The cellulose acetate varies in solubility in the solvent depending on the degree of substitution. So, when the degrees of polymerization at a wide range of degrees of substitution are measured, the degrees of polymerization may have to be measured using different solvent systems and compared. One effective way to avoid this problem is to derivatize the cellulose acetate, dissolve the derivatized cellulose acetate in the same organic solvent, and subject it to GPC-light scattering measurement using the same organic solvent. Propionylation is effective for the derivatization of the cellulose acetate of interest, and specific reaction conditions and post-treatment are as explained in the above description of the measured value of the half-height width of compositional distribution.

(Molecular Weight Distribution Mw/Mn)

The molecular weight distribution (molecular weight distribution Mw/Mn obtained by dividing the weight average molecular weight Mw by the number average molecular weight Mn) of the cellulose acetate of the present disclosure is preferably 3.0 or less and 2.0 or greater, more preferably 2.5 or less and 2.0 or greater, and even more preferably 2.4 or less and 2.0 or greater. When the molecular weight distribution Mw/Mn is greater than 3.0 or less than 2.0, the molding stability of a molded article (for example, physical stability such as dimensional stability and strength of the molded article; more specifically, examples of the stability include the following properties: unnecessary irregularities are less likely to be produced on the surface of the molded article; voids are less likely to be produced inside the molded article; the variation in mechanical strength throughout the molded article is small; and deformation is less likely to occur in a short period of time immediately after molding) is deteriorated. When the molecular weight distribution of the cellulose acetate is 3.0 or less and 2.0 or greater, good thermoformability can be achieved.

The number average molecular weight (Mn), weight average molecular weight (Mw), and molecular weight distribution (Mw/Mn) of the cellulose acetate can be determined by known methods using HPLC. In the present disclosure, the molecular weight distribution (Mw/Mn) of the cellulose acetate is determined by converting a cellulose acetate (sample) into a completely-derivatized cellulose acetate propionate (CAP) by a method similar to that employed when determining the measured value of the half-height width of compositional distribution, for the purpose of making a measurement sample soluble in an organic solvent, and then subjecting the completely-derivatized cellulose acetate propionate (CAP) to size exclusion chromatography analysis under the following conditions (GPC-light scattering method).

Apparatus: "SYSTEM-21H", GPC available from Shodex

Solvent: acetone

Column: two GMHxl columns (Tosoh Corporation), same guard column

Flow rate: 0.8 ml/min.

Temperature: 29° C.

Sample concentration: 0.25% (wt/vol)

Injection volume: 100 µl

Detection: MALLS (multi-angle light scattering detector) ("DAWN-EOS" available from Wyatt Technology Corporation)

Reference material for MALLS calibration: PMMA (molecular weight: 27600)

The molecular weight distribution can be calculated from the weight average molecular weight and number average molecular weight obtained from the measurement results, according to the following equation:

Molecular weight distribution=Mw/Mn where

Mw represents the weight average molecular weight; and

Mn represents the number average molecular weight.

(Total Sulfur Content)

The cellulose acetate included in the cellulose acetate composition for thermoforming of the present disclosure has a total sulfur content of 15 mg/kg or greater and less than 150 mg/kg. The total sulfur content is preferably 15 mg/kg or greater and 100 mg/Kg or less, more preferably 20 mg/kg or greater and 80 mg/Kg or less, even more preferably 25 mg/kg or greater and 70 mg/Kg or less, and most preferably 25 mg/kg or greater and 60 mg/Kg or less.

When the total sulfur content is within this range, the cellulose acetate composition for thermoforming of the present disclosure is resistant to coloring even by heating and has excellent thermal stability, and therefore has excellent physical properties for thermoforming. When the total sulfur content is 150 mg/kg or greater, the cellulose acetate composition for thermoforming has poor thermal stability, and is prone to coloring (particularly, colored yellow) by heating.

The total sulfur content of the cellulose acetate refers to a value obtained by converting the weight of the sulfur compound included in the cellulose acetate per unit weight into the weight of elemental sulfur.

The total sulfur content of the cellulose acetate can be determined by the following method. A dried cellulose acetate is burned in an electric furnace at 1300° C., and the sublimated sulfurous acid gas is trapped in a 10% hydrogen peroxide water, titrated with a normal aqueous sodium hydroxide solution, and the content calculated in terms of $SO_4^{2-}$ is measured as the weight of the sulfate included in the cellulose acetate per unit weight. Next, the total sulfur content is calculated according to the conversion formula: total sulfate content×32/98=total sulfur content.

[Glycerin Ester-Based Plasticizer]

As the glycerin ester-based plasticizer included in the cellulose acetate composition for thermoforming of the present disclosure, a lower fatty acid ester of glycerin, in other words, an ester compound of glycerin and a fatty acid having from 2 to 4 carbons can be used. A fatty acid having 2 carbons is acetic acid, a fatty acid having 3 carbons is propionic acid, and a fatty acid having 4 carbons is butyl acid. The glycerin ester-based plasticizer of the present disclosure may be an ester in which all three hydroxyl groups of glycerin are esterified with the same fatty acids, an ester in which two hydroxyl groups are esterified with the same fatty acids, or an ester in which all three hydroxyl groups of glycerin are esterified with different fatty acids.

The glycerin ester-based plasticizer of the present disclosure is non-toxic and easily biodegraded, and thus has a small environmental load. In addition, the addition of the glycerin ester-based plasticizer to the cellulose acetate of the present disclosure can lower the glass transition temperature of the resulting cellulose acetate composition for thermoforming, thereby making it possible to easily and uniformly melt the cellulose acetate composition for thermoforming by heating and to impart excellent thermoformability to the cellulose acetate. If the cellulose acetate composition can be thermoformed at a lower temperature, the thermoformability can be improved, and, besides, the damage to the cellulose acetate molecules can be reduced. Furthermore, if the damage to the cellulose acetate molecules can be reduced, the life of use as various processed products can be prolonged.

When the fatty acid is acetic acid, examples of the glycerin ester-based plasticizer include triacetin, in which three hydroxyl groups of glycerin are esterified with acetic acid, and diacetin, in which two hydroxyl groups are esterified with acetic acid.

Among the glycerin ester-based plasticizers described above, triacetin (glycerol trisacetate), in which all three hydroxyl groups of glycerin are esterified with acetic acid (in other words, acetylated), is particularly preferred. Triacetin is a component recognized as safe for human intake and is easily biodegraded, and thus has a small environmental load. In addition, the cellulose acetate composition for thermoforming obtained by adding triacetin to the cellulose acetate of the present disclosure has improved biodegradability as compared with that in the case where the cellulose acetate is used alone. Furthermore, the addition of triacetin to the cellulose acetate of the present disclosure can efficiently lower the glass transition temperature of the cellulose acetate, and impart excellent thermoformability.

As described above, triacetin is safe even when taken by a person and can impart excellent thermoformability to a cellulose acetate, and thus can also be used as a capsule material for drug delivery used in so-called drag delivery systems. In addition, the cellulose acetate composition for thermoforming obtained by adding triacetin to the cellulose acetate, even when used as a tobacco member, has no risk of ruining the taste of tobacco.

Preferably, the triacetin may be formed only of pure triacetin in terms of chemical structure. Though the higher purity of the triacetin is more preferable, the triacetin content may be from 80 wt. % or greater or 90 wt. % of the glycerin ester-based plasticizer. The balance may include monoacetin and/or diacetin.

The amount of the glycerin ester-based plasticizer included in the cellulose acetate composition for thermoforming of the present disclosure is not particularly limited, but is preferably 2 parts by weight or greater and 40 parts by weight or less, more preferably 5 parts by weight or greater and 40 parts by weight or less, even more preferably 10 parts by weight or greater and 30 parts by weight or less, and most preferably 10 parts by weight or greater and 25 parts by weight or less, per 100 parts by weight of the total amount of the cellulose acetate and the glycerin ester-based plasticizer. For example, if the content of the glycerin ester-based plasticizer is less than 2 parts by weight, it is not possible to impart sufficient thermoformability to the cellulose acetate, and if the content exceeds 40 parts by weight, there is a higher possibility of the glycerin ester-based plasticizer bleeding out.

[Production of Cellulose Acetate Composition for Thermoforming]

The method for producing a cellulose acetate composition for thermoforming of the present disclosure, includes:

dispersing or dissolving a glycerin ester-based plasticizer in a dispersion medium or a solvent to prepare a dispersion or a solution;

mixing the dispersion or the solution with a cellulose acetate; and vaporizing the dispersion medium or the solvent from a mixture obtained by the mixing, wherein the cellulose acetate has a degree of acetyl substitution of 1.4 or greater and 2.0 or less, a compositional distribution index (CDI), as defined below, of 4.0 or less, and a total sulfur content of 15 mg/kg or greater and less than 150 mg/kg.

CDI=(Measured value of a half-height width of compositional distribution)/(Theoretical value of a half-height width of compositional distribution)

where the measured value of a half-height width of compositional distribution is a half-height width of compositional distribution determined by HPLC analysis of cellulose acetate propionate obtained by propionylating all residual hydroxyl groups of cellulose acetate (sample); and the theoretical value of a half-height width of compositional distribution is defined by:

Theoretical value of half-height width of compositional distribution = [Equation 4]

$$2.35482\sqrt{3*DPw*(DS/3)*(1-DS/3)}/DPw$$

where DS represents a degree of acetyl substitution; and

DPw represents a weight average degree of polymerization (a value determined by GPC-light scattering method using cellulose acetate propionate obtained by propionylating all residual hydroxyl groups of cellulose acetate (sample)).

In the composition, if the glycerin ester-based plasticizer is blended in a nonuniform state in the cellulose acetate, unmelted substances will remain in melts when the composition is thermoformed, such as melt-spun or injection-molded, into a molded article. Thus, the resulting molded article will be nonuniform.

In general, in melt molding of a polymer, a filter (in particular, a mesh filter) is installed for the purpose of removing impurities in the composition. When a large amount of the unmelted substances remain, the unmelted substances quickly cause clogging of the filter. The clogging of the filter increases the head pressure of an extruder thereby reducing the production efficiency of the molded article, and further leading to damage to production devices (such as the extruder).

However, in the method for producing a cellulose acetate composition for thermoforming of the present disclosure, the glycerin ester-based plasticizer is blended in a uniform state in the cellulose acetate, thereby making it possible to improve the processability when thermoforming the composition, and also to improve the production efficiency of the molded article. A cellulose acetate composition for thermoforming, which has excellent biodegradability, is less cloudy, contains less residual unmelted substances, and has excellent thermoformability is obtained. Then, a uniform molded article is obtained without unmelted substances remaining in the melt.

The step of dispersing or dissolving a glycerin ester-based plasticizer in a dispersion medium or a solvent to prepare a dispersion or a solution will be described.

The dispersion medium refers to a liquid in which the plasticizer can be dispersed (particularly, suspended) or emulsified, and the solvent refers to a liquid in which the plasticizer can be dissolved.

The dispersion medium or the solvent is not particularly limited, but is preferably water, ethanol, or a mixed solution of water and ethanol. This is because the dispersion medium or the solvent may cause swelling of the cellulose acetate and facilitate impregnation of the glycerin ester-based plasticizer into the cellulose acetate more easily. This is also because the dispersion medium or the solvent may facilitate an increase in a contact area between the cellulose acetate and the glycerin ester-based plasticizer and the glycerin ester-based plasticizer can thus be blended in the cellulose acetate in a more uniform state. As a result, the unmelted substances may disappear, a more uniform cellulose acetate composition or molded article is obtained without cloudiness or residual unmelted substances. Furthermore, water, ethanol, or a mixed solution of water and ethanol is harmless or less toxic to the human body and has a low boiling point. In particular, water is also low in cost.

The amount of the dispersion medium or solvent to be blended in the cellulose acetate is not particularly limited, but is preferably 50 parts by weight or greater and 150 parts by weight or less, and more preferably 60 parts by weight or greater and 90 parts by weight or less, per 100 parts by weight of the total amount of the cellulose acetate and the glycerin ester-based plasticizer.

The step of mixing the dispersion or the solution with a cellulose acetate will be described.

The mixing can be performed by a mixer such as a planetary mill, a Henschel mixer, a vibration mill, and a ball mill. The dispersion or the solution, if used in a small amount, may be mixed using a food processor or the like. Furthermore, although mixing conditions are not particularly limited, it is preferable to add the dispersion or solution to the cellulose acetate in small portions while stirring the mixture. For example, a rate of adding the dispersion or solution to 100 parts by weight of the cellulose acetate may be, for example, from 2 parts by weight/min. to 20 parts by weight/min.

The step of vaporizing the dispersion medium or the solvent from a mixture obtained by the mixing will be described.

The method for vaporizing the dispersion medium or the solvent is not particularly limited. The mixture may be dried at a temperature of not lower than or lower than the temperature at which the mixture obtained by the mixing melts, but is preferably dried at a temperature of not lower than 0° C. and not higher than 200° C.

When water, ethanol, or a mixed solution of water and ethanol is used as the dispersion medium or the solvent, the mixture can be dried under the following conditions: a temperature of not lower than 20° C. and not higher than 70° C. and 4 hours or longer and 72 hours or shorter.

Further, after the step of vaporizing the dispersion medium or the solvent from the mixture obtained by the mixing, a melt-kneading may be performed. The melt-kneading can be performed under conditions: using an extruder such as a single screw or twin screw extruder, for example, at a temperature of each heating zone set to be not lower than 140° C. and not higher than 170° C.

Further, the step of vaporizing the dispersion medium or the solvent from the mixture obtained by the mixing and the melting/kneading may be performed at the same time. In other words, the dispersion medium or the solvent may be vaporized while the melt-kneading is performed. However, when the vaporization and the melt-kneading are performed simultaneously, ethanol is preferably used as the dispersion medium or the solvent.

As a method for blending the cellulose acetate and the glycerin ester-based plasticizer, there may be employed a method of dissolving the cellulose acetate and the glycerin ester-based plasticizer in a common good solvent, uniformly mixing them, and volatilizing the solvent. Examples of the common good solvent include a mixed solvent of methylene chloride/methanol (weight ratio: 9:1).

In any of the production methods, colorants, heat resistant stabilizers, antioxidants, UV absorbers, and the like can be added depending on the intended use and specification of the molded article, at the time of blending the cellulose acetate and the glycerin ester-based plasticizer.

(Production of Cellulose Acetate)

The cellulose acetate can be produced, for example, by (A) hydrolysis (aging) of a cellulose acetate having a medium to high degree of substitution, (B) precipitation, and, if necessary, (C) washing and neutralization.

((A) Hydrolysis (Aging))

In this step, a cellulose acetate having a medium to high degree of substitution (hereinafter, sometimes referred to as "raw material cellulose acetate") is hydrolyzed. The degree of acetyl substitution of the cellulose acetate with a medium to high degree of substitution, which is used as a raw material, is for example from 1.5 to 3, and preferably from 2 to 3. Commercially available cellulose diacetate (degree of acetyl substitution: from 2.27 to 2.56) and cellulose triacetate (degree of acetyl substitution: greater than 2.56 and 3 or less) can be used as the raw material cellulose acetate.

The hydrolysis reaction can be performed by reacting the raw material cellulose acetate with water in the presence of a catalyst (aging catalyst) in an organic solvent. Examples of the organic solvent include acetic acid, acetone, alcohol (such as methanol), and mixed solvents thereof. Among these organic solvents, a solvent containing at least acetic acid is preferred. A catalyst commonly used as a deacetylation catalyst can be used as the catalyst. The catalyst is particularly preferably sulfuric acid.

The amount of the organic solvent (e.g., acetic acid) to be used is for example from 0.5 to 50 parts by weight, preferably from 1 to 20 parts by weight, and more preferably from 3 to 10 parts by weight, per 1 part by weight of the raw material cellulose acetate.

The amount of the catalyst (e.g., sulfuric acid) to be used is for example from 0.005 to 1 parts by weight, preferably from 0.01 to 0.5 parts by weight, and more preferably from 0.02 to 0.3 parts by weight, per 1 part by weight of the raw material cellulose acetate. If the amount of catalyst is too small, the time of hydrolysis may become too long, thereby causing a decrease in the degree of polymerization (molecular weight) of the cellulose acetate. On the other hand, if the amount of the catalyst is too large, the degree of change in the depolymerization rate with respect to the hydrolysis temperature increases. Even if the hydrolysis temperature is somewhat low, the depolymerization rate increases, and a cellulose acetate with a somewhat high degree of polymerization (molecular weight) is thus less likely to be obtained. Also, the resulting cellulose acetate varies in degree of acetyl substitution and is nonuniform.

The amount of water in the hydrolysis is for example from 0.5 to 20 parts by weight, preferably from 1 to 10 parts by weight, and more preferably from 2 to 7 parts by weight, per 1 part by weight of the raw material cellulose acetate. The amount of the water is for example from 0.1 to 5 parts by weight, preferably from 0.3 to 2 parts by weight, and more preferably from 0.5 to 1.5 parts by weight, per 1 part by weight of the organic solvent (e.g., acetic acid). The entire amount of water may be present in the system at the start of the reaction. However, for the purpose of preventing precipitation of the cellulose acetate, a part of the water used may be present in the system at the start of the reaction and the rest of the water may be added into the system in one to several portions.

The reaction temperature in the hydrolysis is for example from 40 to 130° C., preferably from 50 to 120° C., and more preferably from 60 to 110° C. In particular, when the reaction temperature is set to 90° C. or higher (or a temperature of higher than 90° C.), the reaction equilibrium tends to shift toward an increase in the rate of a reverse reaction (acetylation reaction) opposite to a forward reaction (hydrolysis reaction). This narrows the substitution degree distribution, and can give a cellulose acetate having an extremely small compositional distribution index CDI and a low degree of substitution without any particular approach for post-treatment conditions. In this case, it is preferable to use a strong acid such as sulfuric acid as the catalyst, and to use an excess of acetic acid as the reaction solvent. In addition, even when the reaction temperature is set to 90° C. or lower, a cellulose acetate having an extremely small compositional distribution index CDI and a low degree of substitution can be obtained by performing precipitation using a mixed solvent containing two or more solvents as the precipitation solvent or by performing precipitation fractionation and/or dissolution fractionation, in the precipitation step, as will be described below.

((B) Precipitation)

In this step, after the completion of the hydrolysis reaction, the temperature of the reaction system is cooled to room temperature, and the precipitation solvent is added to precipitate a cellulose acetate having a low degree of substitution. An organic solvent having a high solubility in an organic solvent miscible with water or water can be used as the precipitation solvent. Examples of the precipitation solvent include ketones such as acetone and methyl ethyl ketone; alcohols such as methanol, ethanol, and isopropyl alcohol; esters such as ethyl acetate; nitrogen-containing compounds such as acetonitrile; ethers such as tetrahydrofuran; and mixed solvents thereof.

When a mixed solvent containing two or more types of the solvents is used as the precipitation solvent, similar effects to those obtained by precipitation fractionation which will be described below can be obtained, and a cellulose acetate with a narrow compositional distribution (intermolecular substitution degree distribution), a small compositional distribution index (CDI) and a low degree of substitution can be obtained. Examples of preferred mixed solvents include a mixed solvent of acetone and methanol and a mixed solvent of isopropyl alcohol and methanol.

Furthermore, precipitation fractionation (fractional precipitation) and/or dissolution fractionation (fractional dissolution) is applied to the cellulose acetate with a low degree of substitution obtained by precipitation, and thus a cellulose acetate having a narrow compositional distribution (intermolecular substitution degree distribution), a very small compositional distribution index CDI, and a low degree of substitution can be obtained.

The precipitation fractionation can be performed, for example, by dissolving a cellulose acetate (solid matter) with a low degree of substitution obtained by precipitation in water or a mixed solvent of water or a hydrophilic solvent (for example, acetone) to form an aqueous solution having an appropriate concentration (for example, from 2 to 10 wt. %, preferably from 3 to 8 wt. %); adding a poor solvent to the aqueous solution (or adding the aqueous solution to a poor solvent); keeping the solution at an appropriate temperature (for example, 30° C. or lower, preferably 20° C. or lower) to precipitate a cellulose acetate having a low degree of substitution; and collecting the resulting precipitate. Examples of the poor solvent include alcohols such as methanol and ketones such as acetone. The poor solvent is used for example in an amount from 1 to 10 parts by weight and preferably in an amount from 2 to 7 parts by weight, per 1 part by weight of the aqueous solution.

Dissolution fractionation can be performed, for example, by adding a mixed solvent of water and an organic solvent (for example, a ketone such as acetone, an alcohol such as ethanol, or the like) to the cellulose acetate (solid matter) with a low degree of substitution obtained by the precipitation or the cellulose acetate (solid matter) with a low degree of substitution obtained by the precipitation fractionation; stirring the mixture at an appropriate temperature (for example, from 20 to 80° C., and preferably from 25 to 60° C.); then separating the mixture into a dense phase and a dilute phase by centrifugation; adding a precipitation solvent (for example, a ketone such as acetone, an alcohol such as methanol, or the like) to the dilute phase; and collecting the resulting precipitate (solid matter). The concentration of the organic solvent in the mixed solvent of water and an organic solvent is for example from 5 to 50 wt. % and preferably from 10 to 40 wt. %.

((C) Washing and Neutralization)

The precipitate (solid matter) obtained in the precipitation (B) is preferably washed with an organic solvent (poor solvent), for example, an alcohol such as methanol or a ketone such as acetone. It is also preferable to wash and neutralize the precipitate with an organic solvent containing a basic substance (for example, an alcohol such as methanol or a ketone such as acetone). The washing and neutralization can efficiently remove impurities including the catalyst used in the hydrolysis (such as sulfuric acid).

As the basic substance, alkali metal compounds (e.g., alkali metal hydroxides such as sodium hydroxide and potassium hydroxide; alkali metal carbonates such as sodium carbonate and potassium carbonate; alkali metal hydrogen carbonates such as sodium hydrogen carbonate; alkali metal carboxylates such as sodium acetate and potassium acetate; and sodium alkoxides such as sodium methoxide and sodium ethoxide), alkaline earth metal compounds (e.g., alkaline earth metal hydroxides such as magnesium hydroxide and calcium hydroxide; alkali earth metal carbonates such as magnesium carbonate and calcium carbonate; alkali earth metal carboxylates such as magnesium acetate and calcium acetate; and alkaline earth metal alkoxides such as magnesium ethoxide), and the like can be used. Among them, an alkali metal compound such as potassium acetate is particularly preferred.

[Molded Article]

The molded article of the present disclosure is formed by molding the cellulose acetate composition for thermoforming. The form of the molded article is not particularly limited, and examples include a one-dimensional molded article, such as fibers; a two-dimensional molded article, such as films; and a three-dimensional molded article, such as pellets, tubes, and hollow cylindrical shapes.

In the production of a one-dimensional molded article such as fibers, the molded article can be obtained by spinning the cellulose acetate composition for thermoforming of the present disclosure. Examples of the spinning method include melt spinning (including melt blown spinning).

For example, a fibrous cellulose acetate composite molded article can be obtained by heat-melting the cellulose acetate composition for thermoforming (such as pellets) in a known melt extrusion spinning machine, then spinning it from a spinneret, and stretching continuous long fiber filaments that have been spun by an ejector with the aid of high-velocity and high-pressure air stream and winding them up, or opening the filaments and collecting them on a support surface for collection to form a web. In addition, a nonwoven fabric can be produced by blowing out the cellulose acetate composition for thermoforming that has been melted by an extruder from a die having, for example, hundreds to thousands of spinneret per meter in the width direction; collecting the stretched fibrous resin on a conveyor, and allowing the fibers to entangle and fuse during the collection (melt blown spinning). The spinning temperature during melt spinning is for example from 130 to 240° C., preferably from 140 to 200° C., and more preferably from 150 to 188° C. If the spinning temperature is too high, the molded article is remarkably colored. Furthermore, if the spinning temperature is too low, the viscosity of the composition becomes low, and it becomes difficult to increase the spinning draft ratio. Thus, the productivity tends to decline. For example, the spinning draft ratio is, approximately, from 200 to 600.

The fineness of the yarn obtained by the melt spinning method described above is for example from 1 to 9 denier (d), and preferably from 1.3 to 5 denier (d). For example, the strength of the yarn is, approximately, from 0.3 to 1.5 g/d.

In particular, when the yarn is used as a cellulose acetate tow filter of a cigarette for use in heated tobacco products, the fineness thereof may be from 1 to 40 denier (d), from 3 to 30 denier (d), from 5 to 30 denier (d), from 8 to 25 denier (d), or from 10 to 20 denier (d). Unlike known cigarettes, the heated tobacco products do not involve burning of the tobacco and therefore do not require removal of by-products that would be generated with burning. Thus, the filtration performance (property) of the cellulose acetate tow filter of the cigarette used in heated tobacco products may be much lower than filters used in known cigarettes. Note that the production of a hollow cellulose acetate tube of the cigarette used in the heated tobacco product from a tow requires a long time for the production process including molding into a hollow shape, and may cause an increase in production cost. There is also a technique of increasing the denier of the tow fibers (increasing the thickness of the fibers) for the purpose of achieving low filtration of the filter, but the production of thick denier tow fibers is industrially limited. The tow can hardly fulfill the future demand for further low filtration filters for heated tobacco products. Thus, a three-dimensional molded article may be formed, as will be described below.

Next, in the production of a two-dimensional molded article such as a film, a method of melt film formation can be employed. Examples of the method of melt film formation include extrusion molding and blow molding. Specifically, in the extrusion molding, a film or sheet can be produced, for example, by melt-kneading the cellulose acetate composition for thermoforming of the present disclosure using an extruder such as a single screw or twin screw extruder, extruding the composition and molding it into a film form from a slit in a die, and then cooling the resulting product.

The thickness of the film obtained by the method of melt film formation is for example from 1 µm to 1000 µm, preferably from 5 µm to 500 µm, and more preferably from 10 µm to 250 µm. In particular, when the film is used as a cooling element for cigarettes for use in heated tobacco products, the thickness of the film may be from 15 µm to 200 µm, from 20 µm to 150 µm, 25 µm to 100 µm, or from 35 µm to 70 µm. Because the amount of nicotine that diffuses in the air upon heating of tobacco leaves is small as compared with that of known cigarettes, nicotine must be delivered (distributed) to smokers (people who use heated tobacco products) without any loss. Also, in the case of heated tobacco products in which tobacco leaves are heated, nicotine is included in droplets in the aerosol, but the droplets are too hot to be inhaled by a user, and thus must be cooled in advance. To meet these requirements, the thickness of the film may be in the range described above.

Furthermore, in the production of a three-dimensional molded article such as a hollow cylindrical shape, it can be produced by thermoforming. Specifically, a desired three-dimensional molded article including hollow cylindrical shapes can be produced, for example, by heat compression molding, melt extrusion molding, and injection molding of the cellulose acetate composition for thermoforming of the present disclosure in the form of pellets. For example, an injection molding machine, Micro-1, available from Meiho Co., Ltd., a heat compression molding machine for molding FRP test pieces, ML-48, available from Maruto Testing Machine Company, and the like may be used as the device. The heating temperature at the time of molding may be in the range from 240 to 180° C., and the amounts of additives to be added including the glycerin ester-based plasticizer may be adjusted as appropriate.

The method for preparing the cellulose acetate composition for thermoforming of the present disclosure in the form of pellets is not particularly limited, and examples thereof include a method of, first, preparing the cellulose acetate and glycerin ester-based plasticizer of the present disclosure through dry or wet pre-mixing using mixers such as a tumbler mixer, a Henschel mixer, a ribbon mixer, and a kneader, and then melt-kneading them in an extruder such as a single or twin screw extruder to prepare the cellulose acetate composition for thermoforming in the form of pellets.

The specific method for forming a three-dimensional molded article from the cellulose acetate composition for thermoforming of the present disclosure in the form of pellets by melt extrusion molding is not particularly limited. For example, injection molding, extrusion molding, vacuum molding, profile molding, foam molding, injection press, press molding, blow molding, gas injection molding, and the like can be used.

As described above, there is the method in which the cellulose acetate and glycerin ester-based plasticizer of the present disclosure are melt-kneaded in an extruder to prepare pellets and then to form a molded article. Additionally, the desired three-dimensional molded article including hollow cylindrical shapes can be produced by depositing the glycerin ester-based plasticizer to surfaces of cellulose acetate flakes, and heating the material, and performing compression-molding on the heated material. The compression molding may be performed using a commercially available compression molding machine at a temperature from 150° C. to 240° C. and desirably 230° C., and a pressure of 0.01 MPa or higher and desirably 0.5 MPa for 30 seconds or more and desirably approximately 2 minutes. The "cellulose ester flakes" refers to a flake-shaped cellulose ester obtained by acetylating the cellulose, then performing a hydrolysis reaction to adjust the average degree of substitution, and purifying and drying the reaction product.

The three-dimensional molded article in the form of a hollow cylindrical shape may be used as it is as a hollow cellulose acetate tube of a cigarette for use in heated tobacco products, or may be a long member before cutting, which can be cut in the direction orthogonal to the axial direction to provide a hollow cellulose acetate tube of a cigarette for use in heated tobacco products.

EXAMPLES

Hereinafter, the present invention will be specifically described with reference to examples, but the technical scope of the present invention is not limited by these examples.

Each physical property of Examples, Comparative Example, and Reference Example described below was evaluated according to the following methods.

<Degree of Acetyl Substitution, Weight Average Molecular Weight (Mw), Number Average Molecular Weight (Mn), Compositional Distribution Index (CDI), and Total Sulfur Content>

The degree of acetyl substitution, weight average molecular weight (Mw), number average molecular weight (Mn), compositional distribution index (CDI), and total sulfur content were determined by the methods described above. Additionally, the combined acetic acid, measured value of the half-height width of compositional distribution, molecular weight distribution (Mw/Mn), and weight average degree of polymerization (DPw), which were associated with them, were also determined by the methods described above. Similarly to the weight average degree of polymerization (DPw), the number average degree of polymerization (DPn) is a value determined by the GPC-light scattering method using a cellulose acetate propionate obtained by propionylating all residual hydroxyl groups of a cellulose acetate (sample).

<Thermoformability Evaluation>

The thermoformability was evaluated by measuring the glass transition temperature. A DSC curve was measured using a differential scanning calorimeter (DSC) (differential scanning calorimeter DSC Q2000, available from TA Instruments) under the following conditions: nitrogen atmosphere, 1st heat: a temperature ranging from 30° C. to 200° C., 2nd heat: a temperature ranging from 30° C. to 250° C., and a heating rate: 20° C./min. A temperature at a point of intersection of a straight line that was equidistant in the ordinate axis direction from extended straight lines of base lines before and after glass transition in the DSC curve and a curve at a stepped transition portion of the glass transition (midpoint glass transition temperature) was taken as the glass transition temperature Tg (° C.).

<Biodegradability>

The biodegradability was evaluated by a method of measuring the degree of biodegradation using activated sludge in accordance with JIS K6950. The activated sludge was obtained from the Tatara River purification center in Fukuoka prefecture. About 300 mL of a supernatant (activated sludge concentration: about 360 ppm) obtained by allowing the activated sludge to stand for approximately 1 hour was used per culture bottle. The measurement was started when 30 mg of the sample was stirred in the supernatant, and then the sample was measured every 24 hours until after 720 hours, that is until after 30 days, a total of 31 times. Details of the measurement are as follows. The biochemical oxygen demand (BOD) in each culture bottle was measured using a Coulometer OM3001 available from Ohkura Electric Co., Ltd. The percentage of the biochemical oxygen demand (BOD) to the theoretical biochemical oxygen demand (BOD) for complete degradation based on the chemical composition of each sample was taken as the degree of biodegradation (wt. %).

<Water Resistance Evaluation>

One (1) part by weight of each sample (a cellulose acetate or a cellulose acetate composition) was dissolved in 5 parts by weight of a mixed solvent of methylene chloride/methanol (weight ratio: 9:1), and a film sample was prepared by solution casting using a glass substrate. The film sample has a size of 2 cm×2 cm and a thickness of about 120 μm. The film sample was placed in a 100-ml size bottle containing 80 ml of pure water, and the bottle was rotated at a rotational speed of 14 rpm with a rotating machine, and changes in the shape and weight of the film sample over time were evaluated. The shape was observed by the naked eye. The weight was determined as follows. The film sample was taken out from pure water, and water droplets were wiped off. The film sample was dried in a dryer at 105° C. for 1 h, and then weighed using an analytical precision electronic balance. The amount (%) of weight change from the weight at the start of the rotation was determined. The details of the evaluations shown in Table 1 are as follows.

Good: At one (1) hour after the start of the rotation, the film sample was not damaged or deformed, and showed a decrease of less than 10% in the amount of weight change.

Marginal: At one (1) hour after the start of the rotation, the film sample showed a decrease of less than 10% in the amount of weight change, but was damaged or deformed; or the film sample was not damaged or deformed, but showed a decrease of 10% or greater in the amount of weight change.

Poor: The film sample was completely dissolved within one hour from the start of the rotation.

Example A-1

To 1 part by weight of a raw material cellulose acetate (trade name: "L-50" available from Daicel Corporation; total degree of acetyl substitution: 2.43; 6% viscosity: 110 mPa·s), 5.1 parts by weight of acetic acid and 2.0 parts by weight of water were added. The mixture was stirred for 3 hours to dissolve the cellulose acetate. To this solution, 0.13 parts by weight of sulfuric acid was added. The resulting solution was held at 95° C. and hydrolyzed. For the purpose of preventing the cellulose acetate from precipitating during the hydrolysis, water was added to the system in two portions. Specifically, 0.3 hours after the start of the reaction, 0.67 parts by weight of water was added to the system over 5 minutes. After 0.7 hours, 1.33 parts by weight of water was further added to the system over 10 minutes, and the mixture was reacted for additional 1.5 hours. The total hydrolysis time is 2.5 hours. A step ranging from the start of the reaction to the first addition of water is referred to as first hydrolysis (first aging). A step ranging from the first addition of water to the second addition of water is referred to as second hydrolysis (second aging). A step ranging from the second addition of water to the end of the reaction is referred to as third hydrolysis (third aging).

After the hydrolysis was performed, the temperature of the system was cooled to room temperature (about 25° C.), and 15 parts by weight of the precipitating solvent (methanol) was added to the reaction mixture to form a precipitate.

The precipitate was collected as a wet cake with a solid content of 15 wt. %. Eight (8) parts by weight of methanol was added, and the precipitate was subjected to liquid removal to a solid content of 15 wt. % and thus washed. The procedures were repeated three times. The washed precipitate was further washed twice with 8 parts by weight of methanol containing 0.004 wt. % of potassium acetate, neutralized, and dried to yield a cellulose acetate having a degree of acetyl substitution of 1.7. This is referred to as cellulose acetate A. The physical properties of cellulose acetate A are as shown in Table 4.

The obtained cellulose acetate A (98 parts by weight) and triacetin (2 parts by weight) as the glycerin ester-based plasticizer were dissolved and uniformly mixed in a mixed solvent of methylene chloride/methanol (weight ratio: 9:1). Next, the conditions were changed sequentially: for 3 minutes at room temperature; for 30 minutes in a dryer set to a temperature of 45° C.; and for 30 minutes in a dryer set to a temperature of 150° C. Then, the solvent was volatilized to yield a cellulose acetate composition for thermoforming.

The thermoformability of the obtained cellulose acetate composition for thermoforming was evaluated by the method described above. The results are shown in Table 1.

Examples A-2 to A-5

A cellulose acetate composition for thermoforming was obtained in the same manner as in Example A-1, except that the amounts of cellulose acetate A and triacetin were changed to those shown in Table 1.

The thermoformability of the obtained cellulose acetate composition for thermoforming was evaluated by the method described above. For Example A-4, the thermoformability, biodegradability, and water resistance were evaluated by the methods described above. The results are shown in Tables 1 and 2. As for the water resistance evaluation of Example A-4, the sample was continuously rotated in a container containing water, and the weight was reduced by approximately 6% after the elapse of one hour. However, the sample itself was not damaged or deformed.

Example A-6

A cellulose acetate composition for thermoforming was obtained in the same manner as in Example A-1, except that 95 parts by weight of cellulose acetate A was used and that 5 parts by weight of diacetin was used as the glycerin ester-based plasticizer.
The thermoformability of the obtained cellulose acetate composition for thermoforming was evaluated by the method described above. The results are shown in Table 1.

Examples A-7 to A-8

A cellulose acetate composition for thermoforming was obtained in the same manner as in Example A-6, except that the amounts of cellulose acetate A and diacetin were changed to those shown in Table 1.
The thermoformability of the obtained cellulose acetate composition for thermoforming was evaluated by the method described above. The results are shown in Table 1.

Example A-9

To an acid-treated cotton linters (in other words, a mixture of 7 parts by weight of pulp and 4 parts by weight of acetic acid; the cotton linters had a basis weight of: 525 g/m$^2$ and a density of: 0.45 g/cm$^3$), 1 part by weight of sulfuric acid, 16 parts by weight of an acetic anhydride, and 24 parts by weight of acetic acid were added, and the mixture was acetylated at 36° C. for 125 minutes. To the pulp-containing reaction product obtained by acetylation, magnesium acetate, water vapor, and water were added, and the mixture was hydrolyzed at 85° C. for 340 minutes. The hydrolysate was purified and dried to yield a cellulose acetate having a combined acetic acid of 49.4% and a weight average degree of polymerization (DPw) of 420. This is referred to as cellulose acetate B. The physical properties of cellulose acetate B are as shown in Table 4.
Cellulose acetate B (80 parts by weight) and triacetin (20 parts by weight) as the glycerin ester-based plasticizer were dissolved and uniformly mixed in a mixed solvent of methylene chloride/methanol (weight ratio: 9:1). Next, the conditions were changed sequentially: for 3 minutes at room temperature; for 30 minutes in a dryer set to a temperature of 45° C.; and for 30 minutes in a dryer set to a temperature of 150° C. Then, the solvent was volatilized to yield a cellulose acetate composition for thermoforming.
The thermoformability and water resistance of the obtained cellulose acetate composition for thermoforming were evaluated by the methods described above. The results are shown in Table 2. As for the water resistance evaluation, the sample was continuously rotated in a container containing water, and the weight was reduced by approximately 2% after the elapse of one hour. However, the sample itself was not damaged or deformed.

Comparative Example A-1

A cellulose acetate composition was obtained in the same manner as in Example A-1, except that no glycerin ester-based plasticizer was added to cellulose acetate A. The thermoformability, biodegradability and water resistance of the obtained cellulose acetate composition were evaluated by the methods described above. The results are shown in Tables 1 and 2. As for the water resistance evaluation, the sample was continuously rotated in a container containing water, and no weight reduction was observed after the elapse of one hour. The sample itself was not damaged or deformed.

Comparative Example A-2

To 1 part by weight of a raw material cellulose acetate (trade name: "L-50" available from Daicel Corporation; total degree of acetyl substitution: 2.43; 6% viscosity: 110 mPa·s), 5.1 parts by weight of acetic acid and 2.0 parts by weight of water were added. The mixture was stirred for 3 hours to dissolve the cellulose acetate. To this solution, 0.13 parts by weight of sulfuric acid was added. The resulting solution was held at 100° C. and hydrolyzed. For the purpose of preventing the cellulose acetate from precipitating during the hydrolysis, water was added to the system in two portions. Specifically, 0.25 hours after the start of the reaction, 0.67 parts by weight of water was added to the system over 5 minutes. After 0.5 hours, 1.33 parts by weight of water was further added to the system over 10 minutes, and the mixture was reacted for additional 1.25 hours. The total hydrolysis time is 2 hours. A step ranging from the start of the reaction to the first addition of water is referred to as first hydrolysis (first aging). A step ranging from the first addition of water to the second addition of water is referred to as second hydrolysis (second aging). A step ranging from the second addition of water to the end of the reaction is referred to as third hydrolysis (third aging).
After the hydrolysis was performed, the temperature of the system was cooled to room temperature (about 25° C.), and 15 parts by weight of the precipitating solvent (methanol) was added to the reaction mixture to form a precipitate.
The precipitate was collected as a wet cake with a solid content of 15 wt. %. Eight (8) parts by weight of methanol was added, and the precipitate was subjected to liquid removal to a solid content of 15 wt. % and thus washed. The procedures were repeated three times. The washed precipitate was further washed twice with 8 parts by weight of methanol containing 0.004 wt. % of potassium acetate, neutralized, and dried to yield a cellulose acetate having a degree of acetyl substitution of 0.87.
The degree of acetyl substitution, weight average molecular weight (Mw), number average molecular weight (Mn), and compositional distribution index (CDI) of the obtained cellulose acetate were measured. A cellulose acetate composition was obtained in the same manner as in Comparative Example A-1, except that cellulose acetate A was replaced with a cellulose acetate having a degree of acetyl substitution of 0.87. The biodegradability and water resistance of the obtained cellulose acetate composition were evaluated by the methods described above. The results are shown in Tables 1 and 2. In addition, the sample was continuously rotated in a container containing water. After the elapse of one hour, the sample itself was completely dissolved, and thus the weight thereof could not be measured.

Comparative Example A-3

A cellulose acetate composition was obtained in the same manner as in Comparative Example A-1, except that cellulose acetate A was replaced with cellulose acetate B. The thermoformability, biodegradability and water resistance of the obtained cellulose acetate composition were evaluated by the methods described above. The results are shown in Tables 1 and 2. As for the water resistance evaluation, the sample was continuously rotated in a container containing water, but the weight was hardly reduced even after the elapse of 24 hours. The sample itself was not damaged or deformed.

TABLE 1

|  |  | Example A-1 | Example A-2 | Example A-3 | Example A-4 | Example A-5 | Example A-6 | Example A-7 | Example A-8 |
|---|---|---|---|---|---|---|---|---|---|
| Cellulose acetate | Type | Cellulose acetate A | | | | | | | |
| | Degree of acetyl substitution | 1.7 | | | | | | | |
| | Weight average molecular weight (Mw) (×10^4) | 9.1 | | | | | | | |
| | Number average molecular weight (Mn) (×10^4) | 3.9 | | | | | | | |
| | Compositional distribution index (CDI) | 4.08 | | | | | | | |
| | Total sulfur content (mg/kg) | 50 | | | | | | | |
| | Content (parts by weight) | 98 | 95 | 90 | 80 | 75 | 95 | 90 | 80 |
| Glycerin ester-based plasticizer | Triacetin Content (parts by weight) | 2 | 5 | 10 | 20 | 25 | — | — | — |
| | Diacetin Content (parts by weight) | — | — | — | — | — | 5 | 10 | 20 |
| Thermoformability evaluation: glass transition temperature Tg (° C.) | | 191.6 | 177.6 | 162.3 | 144.6 | 145.4 | 176.6 | 163.7 | 141 |
| Biodegradability evaluation: Degree of biodegradation after 10 days (wt. %) | | — | — | — | 52.6 | — | — | — | — |
| Water resistance evaluation | | — | — | — | Good | — | — | — | — |

|  |  | Example A-9 | Comparative Examples A-1 | Comparative Examples A-2 | Comparative Examples A-3 |
|---|---|---|---|---|---|
| Cellulose acetate | Type | Cellulose acetate B | Cellulose acetate A | — | Cellulose acetate B |
| | Degree of acetyl substitution | 2.0 | 1.7 | 0.87 | 2.0 |
| | Weight average molecular weight (Mw) (×10^4) | 10.4 | 9.1 | 3.6 | 10.4 |
| | Number average molecular weight (Mn) (×10^4) | 5.0 | 3.9 | 1.9 | 5.0 |
| | Compositional distribution index (CDI) | 3.66 | 4.08 | 1.43 | 3.66 |
| | Total sulfur content (mg/kg) | 54 | 50 | No data | 54 |
| | Content (parts by weight) | 80 | 100 | 100 | 100 |
| Glycerin ester-based plasticizer | Triacetin Content (parts by weight) | 20 | — | — | — |
| | Diacetin Content (parts by weight) | — | — | — | — |
| Thermoformability evaluation: glass transition temperature Tg (° C.) | | 140.9 | 201.4 | — | 195.3 |
| Biodegradability evaluation: Degree of biodegradation after 10 days (wt. %) | | — | 40.5 | 75.1 | 34.7 |
| Water resistance evaluation | | Good | Good | Poor | Good |

TABLE 2

| | Amount (%) of weight change | | | | |
|---|---|---|---|---|---|
| Time (h) elapsed from start of rotation | Example A-4 | Example A-9 | Comparative Examples A-1 | Comparative Examples A-2 | Comparative Examples A-3 |
| 0 | 0.00 | 0.00 | 0.00 | 0.00 | 0.00 |
| 0.5 | −4.35 | −1.25 | −0.43 | −76.11 | −0.15 |
| 1 | −6.42 | −2.45 | 0.28 | −100 | −0.18 |
| 5 | −14.33 | −5.03 | −2.67 | −100 | −0.87 |
| 12 | −15.45 | −5.83 | −3.03 | −100 | −1.11 |
| 24 | −16.40 | −6.21 | −3.54 | −100 | −1.11 |

As shown in Table 1, the cellulose acetate compositions for thermoforming of the Examples included the glycerin ester-based plasticizer, thereby increasing the degree of biodegradation after 10 days and improving the biodegradability. In addition, the glass transition temperature was lowered, and the cellulose acetate compositions for thermoforming could be easily melted uniformly by heating and confirmed to have excellent thermoformability. Furthermore, as shown in Tables 1 and 2, it could also be confirmed that the cellulose acetate compositions for thermoforming of the Examples had water resistance comparable to that of the cellulose acetate.

In addition, the glass transition temperature of the cellulose acetate composition of Example A-1 was 191.6° C., which was 10° C. lower than 201.4° C. in Comparative Example A-1. A cellulose acetate having a degree of acetyl substitution of 1.7 had the property of pyrolysis onset of around 220° C. and complete pyrolysis at 250° C. or higher. On the other hand, the cellulose acetate composition of Example A-1 could be thermoformed at a temperature lower than that for the cellulose acetate composition of Comparative Example A-1, and thus had a prolonged life of use as various processed products.

Example B-1

Cellulose acetate A was pulverized into a powder form, dried in a dryer set to a temperature of 105° C. for one hour, and then allowed to cool at room temperature in a desiccator for one hour.

A solution of triacetin and ethanol was prepared by mixing 30 parts by weight (150 g) of triacetin as the glycerin ester-based plasticizer and 70 weight parts (350 g) of ethanol as the dispersion medium or solvent and vibrating the mixture in a shaker.

Seventy (70) parts by weight (350 g) of the cellulose acetate having a degree of acetyl substitution of 1.7 after drying and allowing to cool was placed in a food processor (DLC-NXPLUS available from Cuisinart) (hereinafter referred to also as "mixer"). Then, the solution was added to the cellulose acetate at a rate of about 50 g/min. using a pipette or atomizer while being stirred with a mixer.

Once a half amount of the solution prepared was added, the mixer was stopped once, and the blend materials deposited on the wall, bottom, and stirrer blade of the mixer were taken off. The mixer was then started again and the rest of the solution was subsequently added at a rate of about 50 g/min.

Once the addition of the solution ended, the mixer was stopped again, the blend materials deposited on the wall, bottom, and stirrer blade of the mixer were taken off. Then, the mixer was then started again, and the blend materials were stirred for additional 1 minute or more.

The blend materials were placed in a flat, airy container and dried at room temperature for 72 hours or more. Large masses were then removed from the blend materials through a sieve (sieve opening: 3.35 mm).

The blend materials were placed in a twin screw extruder (Process11 available from Thermo Fisher Scientific, Inc.) (hereafter referred to also as "small twin screw extruder") and extruded at from 145 to 165° C. to yield strands.

<State after Heat Processing (Extrusion)>

The state of the resulting product after the extrusion was visually observed. The results are shown in Table 3 and illustrated in FIG. 1. Details of the evaluation were as follows.

Completely melted: No unmelted substance was confirmed, resulting in a wholly transparent and uniform molded article.

Unmelted substance remained: A molded article having a transparent portion but partially containing unmelted substances was obtained.

Cloudiness/turbidity occurred: A wholly cloudy molded article was obtained (including those partially containing unmelted substances).

No melting: The cellulose acetate did not melt and remained powdery.

The reason why unmelted substances remained and cloudiness/turbidity occurred was assumed to be due to a non-uniform melt state and a difference in viscosity depending on the part.

Example B-2

Figure 2:
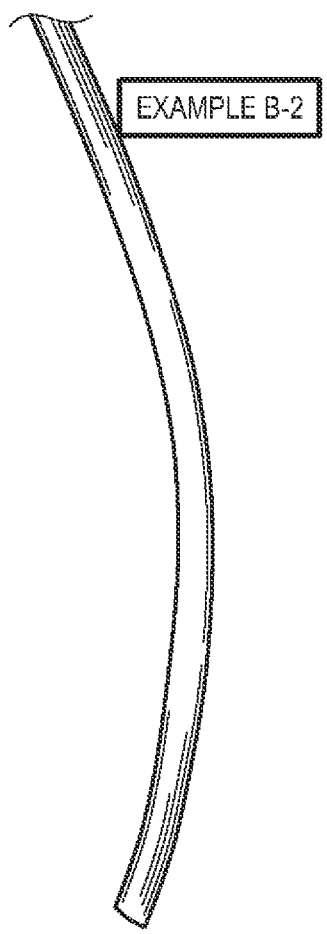
FIG. 2 is an explanatory diagram illustrating an example of the state of the cellulose acetate composition after heat processing (extrusion).

Strands were obtained in the same manner as in Example B-1, except that diacetin was used, in place of triacetin, as the glycerin ester-based plasticizer. The state of the resulting product after the extrusion was visually observed. The results are shown in Table 3 and illustrated in FIG. 2.

Example B-3

Figure 3:
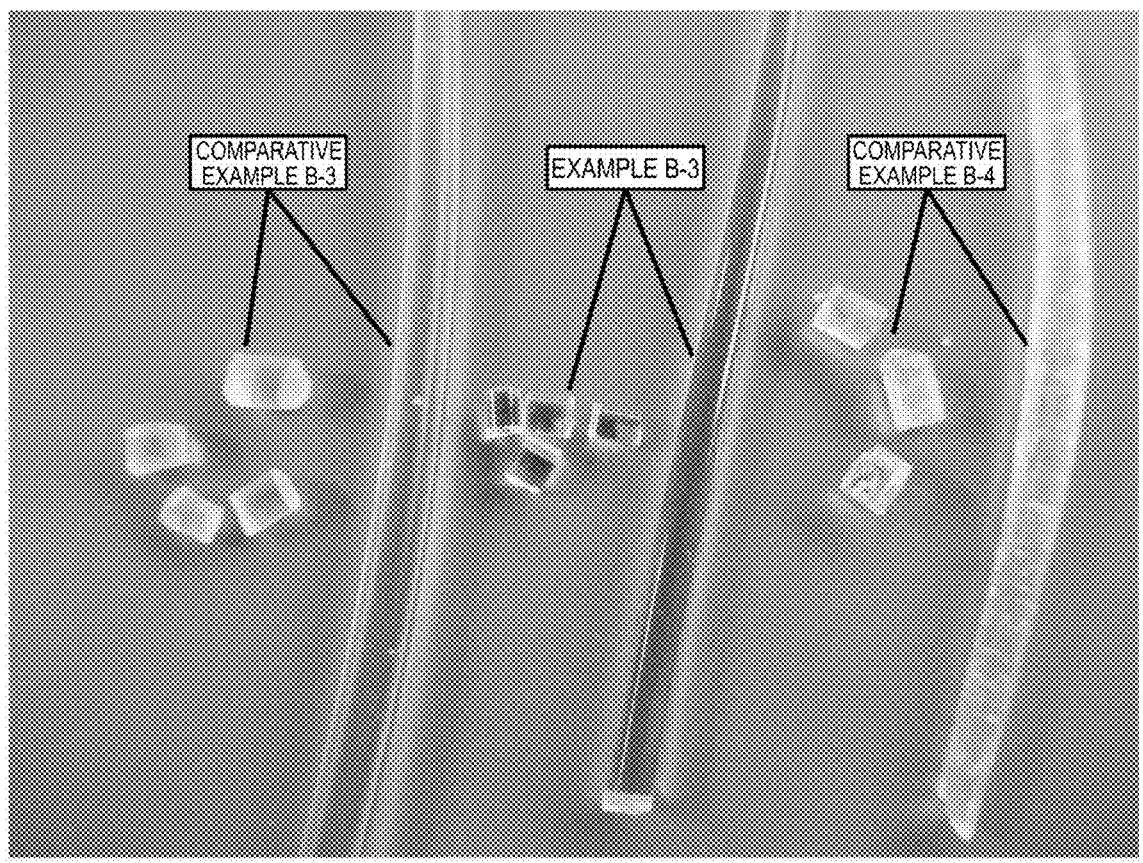
FIG. 3 is an explanatory diagram illustrating an example of the state of the cellulose acetate composition after heat processing (extrusion).

Strands were obtained in the same manner as in Example B-1, except that water was used in place of ethanol as the dispersion medium or the solvent, and that the mixture of triacetin and water was not a solution, but an emulsion. In addition, the state of the resulting product after the extrusion, in which the strands were cut into the form of pellets, was visually observed. The coloration was evaluated by the following method. The results are shown in Table 3 and illustrated in FIG. 3.

<Coloration Evaluation>

The strands were cut into the form of pellets. The pellets were processed into a plate sample having a thickness of 3 mm at 180° C. using a heat press (HC300-01 available from As One Corporation). The b value of the plate sample was measured using a Spectro Color Meter SQ2000 (Nippon Denshoku Industries Co., Ltd.). As the b value is higher, the yellowness increases.

Example B-4

Strands were obtained in the same manner as in Example B-2, except that water was used in place of ethanol as the dispersion medium or the solvent. The state of the resulting product after the extrusion was visually observed. The results are shown in Table 3.

Example B-5

Strands were obtained in the same manner as in Example B-1, except that cellulose acetate A was replaced with cellulose acetate B. The state of the resulting product after the extrusion was visually observed. The results are shown in Table 3.

Example B-6

Strands were obtained in the same manner as in Example B-3, except that cellulose acetate A was replaced with cellulose acetate B. The state of the resulting product after the extrusion was visually observed. The results are shown in Table 3.

Comparative Example B-1

Cellulose acetate A was pulverized into a powder form, dried in a dryer set to a temperature of 105° C. for one hour, and then allowed to cool at room temperature in a desiccator for one hour.

The cellulose acetate after drying and allowing to cool was placed in a small twin screw extruder and extruded at a temperature from 180 to 220° C. The state of the resulting product after the extrusion was visually observed. The results are as shown in Table 3, and the whole cellulose acetate was unmelted, and the kneading rod of the extruder automatically stopped due to overload.

Comparative Example B-2

The extrusion was performed in the same manner as in Comparative Example B-1, except that cellulose acetate A was replaced with cellulose acetate B. The state of the resulting product after the extrusion was visually observed. The results are shown in Table 3.

Comparative Example B-3

A mixture containing 13 wt. % of softwood pulp (basis weight: 856 g/cm³, density: 0.56 g/cm³), 2 wt. % of sulfuric acid, 35 wt. % of acetic anhydride, and 50 wt. % of glacial acetic acid per total absolute dry weight was acetylated at 36° C. for 3 hours. Thereafter, the reaction product after the reaction was neutralized with potassium acetate, and water vapor and water were then added to the reaction product. The mixture was hydrolyzed at 60° C. for 6 hours, and the hydrolysate was purified and dried to yield a cellulose acetate having a combined acetic acid of approximately 45% and a weight average degree of polymerization of approximately 300. This is referred to as cellulose acetate C. The physical properties of cellulose acetate C are as shown in Table 4.

Strands and pellets were obtained in the same manner as in Example B-3, except that cellulose acetate A was replaced with cellulose acetate C. The state of the resulting product after the extrusion was visually observed. The results are shown in Table 3 and illustrated in FIG. 3. A very small amount of unmelted substances remained. In addition, cloudiness/turbidity occurred more prominently on the surface when the product was prepared in the form of pellets.

Comparative Example B-4

Strands and pellets were obtained in the same manner as in Example B-3, except that cellulose acetate A was replaced with cellulose acetate C and that no dispersion medium or solvent was used. The state of the resulting product after the extrusion was visually observed. The results are shown in Table 3 and illustrated in FIG. 3. A large amount of unmelted substances remained.

Comparative Example B-5

Cellulose acetate A was pulverized into a powder form, dried in a dryer set to a temperature of 105° C. for one hour, and then allowed to cool at room temperature in a desiccator for one hour.

Seventy (70) parts by weight (350 g) of cellulose acetate A after drying and allowing to cool was placed in a mixer. The addition of 30 parts by weight (150 g) of triacetin to the cellulose acetate was initiated at a rate of about 15 g/min. with a pipette or atomizer while stirring with a mixer.

Once a half amount of the triacetin was added, the mixer was stopped once, and the blend materials deposited on the wall, bottom, and stirrer blade of the mixer were taken off. The mixer was then started again and the rest of the triacetin was subsequently added at a rate of about 15 g/min.

Once the addition of the triacetin ended, the mixer was stopped again, the blend materials deposited on the wall, bottom, and stirrer blade of the mixer were taken off. Then, the mixer was then started again, and the blend materials were stirred for additional 1 minute or more.

The blend materials were thoroughly taken off and placed in an airy, open vessel such as a vat, and dried at 80° C. for 2 hours. Large masses were then removed from the blend materials through a sieve (sieve opening: 3.35 mm).

The blend materials were placed in a small twin screw extruder and extruded at a temperature from 180 to 220° C. to yield strands. The state of the strands after the extrusion was visually observed. As a result, the blend materials were melted, but unmelted substances remained in the strands.

Comparative Example B-6

Strands were obtained in the same manner as in Comparative Example B-5, except that diacetin was used in place of triacetin as the glycerin ester-based plasticizer. The state of the resulting product after the extrusion was visually observed. As a result, the blend materials were melted, but unmelted substances remained in the strands.

Comparative Example B-7

Strands were obtained in the same manner as in Comparative Example B-5, except that cellulose acetate A was replaced with cellulose acetate B. The state of the resulting product after the extrusion was visually observed. As a result, the blend materials were melted, but unmelted substances slightly remained in the strands.

Reference Example 1

A cellulose acetate having a degree of acetyl substitution of 2.45 (cellulose acetate available from Daicel Corporation; limiting viscosity: 84 mPa·s) was pulverized into a powder form, dried in a dryer set to a temperature of 105° C. for one hour, and then allowed to cool at room temperature in a desiccator for one hour. Note that the physical properties of the cellulose acetate are as shown in Table 3.

The cellulose acetate after drying and allowing to cool was placed in a small twin screw extruder and extruded at a temperature from 180 to 220° C. The state of the resulting product after the extrusion was visually observed. The results are as shown in Table 3, and the whole cellulose acetate was unmelted, and the kneading rod of the extruder automatically stopped due to overload.

Reference Example 2

A cellulose acetate having a degree of acetyl substitution of 2.45 (cellulose acetate available from Daicel Corporation; limiting viscosity: 84 mPa·s) was pulverized into a powder form, dried in a dryer set to a temperature of 105° C. for one hour, and then allowed to cool at room temperature in a desiccator for one hour.

Seventy (70) parts by weight (350 g) of the cellulose acetate having a degree of acetyl substitution of 2.45 after drying and allowing to cool was placed in a mixer. The addition of 30 parts by weight (150 g) of triacetin to the cellulose acetate was initiated at a rate of about 15 g/min. with a pipette or atomizer while stirring with a mixer.

Once a half amount of the triacetin was added, the mixer was stopped once, and the blend materials deposited on the wall, bottom, and stirrer blade of the mixer were taken off. The mixer was then started again and the rest of the triacetin was subsequently added at a rate of about 15 g/min.

Once the addition of the triacetin ended, the mixer was stopped again, the blend materials deposited on the wall, bottom, and stirrer blade of the mixer were taken off. Then, the mixer was then started again, and the blend materials were stirred for additional 1 minute or more.

The blend materials were thoroughly taken off and placed in an airy, open vessel such as a vat, and dried at 80° C. for 2 hours. Large masses were then removed from the blend materials through a sieve (sieve opening: 3.35 mm).

The blend materials were placed in a small twin screw extruder and extruded at a temperature from 180 to 220° C. to yield strands. The state of the resulting product after the extrusion was visually observed. The results are as shown in Table 3, and cellulose was completely melted, resulting in the formation of a wholly transparent and uniform molded article.

Reference Example 3

Strands were obtained in the same manner as in Reference Example 2, except that diacetin was used instead of triacetin as the glycerin ester-based plasticizer. The state of the resulting product after the extrusion was visually observed. The results are as shown in Table 3, and cellulose was completely melted, resulting in the formation of a wholly transparent and uniform molded article.

TABLE 3

|  |  | Example B-1 | Example B-2 | Example B-3 | Example B-4 | Example B-5 | Example B-6 | Comparative Example B-1 |
|---|---|---|---|---|---|---|---|---|
| Cellulose acetate | Type | Cellulose acetate A | Cellulose acetate A | Cellulose acetate A | Cellulose acetate A | Cellulose acetate B | Cellulose acetate B | Cellulose acetate A |
|  | Degree of acetyl substitution | 1.7 | 1.7 | 1.7 | 1.7 | 2.0 | 2.0 | 1.7 |
|  | Weight average molecular weight (Mw) (×10^4) | 9.1 | 9.1 | 9.1 | 9.1 | 10.4 | 10.4 | 9.1 |
|  | Number average molecular weight (Mn) (×10^4) | 3.9 | 3.9 | 3.9 | 3.9 | 5.0 | 5.0 | 3.9 |
|  | Compositional distribution index (CDI) | 4.08 | 4.08 | 4.08 | 4.08 | 3.66 | 3.66 | 4.08 |
|  | Total sulfur content (mg/kg) | 50 | 50 | 50 | 50 | 54 | 54 | 50 |
|  | Content (parts by weight) | 70 | 70 | 70 | 70 | 70 | 70 | 100 |
| Glycerin ester-based plasticizer | Triacetin Content (parts by weight) | 30 | — | 30 | — | 30 | 30 | — |
|  | Diacetin Content (parts by weight) | — | 30 | — | 30 | — | — | — |
| Dispersion medium or solvent |  | Ethanol | Ethanol | Water | Water | Ethanol | Water | — |
| State after heat processing (extrusion) |  | Completely melted | Completely melted | Completely melted | Completely melted | Completely melted | Completely melted | Completely melted |
| Coloration evaluation: b value |  | — | — | 3.6 | — | — | — | — |

|  |  | Comparative Example B-2 | Comparative Example B-3 | Comparative Example B-4 | REFERENCE EXAMPLE 1 | REFERENCE EXAMPLE 2 | REFERENCE EXAMPLE 3 |
|---|---|---|---|---|---|---|---|
| Cellulose acetate | Type | Cellulose acetate B | Cellulose acetate C | Cellulose acetate C | — | — | — |
|  | Degree of acetyl substitution | 2.0 | 1.77 | 1.77 | 2.45 | 2.45 | 2.45 |
|  | Weight average molecular weight (Mw) (×10^4) | 10.4 | 7.0 | 7.0 | 18.0 | 18.0 | 18.0 |
|  | Number average molecular weight (Mn) (×10^4) | 5.0 | 2.8 | 2.8 | 7.5 | 7.5 | 7.5 |
|  | Compositional distribution index (CDI) | 3.66 | 6.35 | 6.35 | 2.60 | 2.60 | 2.60 |
|  | Total sulfur content (mg/kg) | 54 | 162 | 162 | 45 | 45 | 45 |
|  | Content (parts by weight) | 100 | 70 | 70 | 100 | 70 | 70 |
| Glycerin ester-based plasticizer | Triacetin Content (parts by weight) | — | 30 | 30 | — | 30 | — |
|  | Diacetin Content (parts by weight) | — | — | — | — | — | 30 |
| Dispersion medium or solvent |  | — | — | Water | — | — | — |
| State after heat processing (extrusion) |  | Unmelted | Unmelted | Cloudiness/ turbidity occurred | Unmelted substance remained | Completely melted | Completely melted |
| Coloration evaluation: b value |  | — | 4.9 | — | — | — | — |

TABLE 4

| Type | Degree of acetyl substitution | Combined acetic acid (%) | Measured value of half-height width of compositional distribution | Number average molecular weight (Mn) | Weight average molecular weight (Mw) | Molecular weight distribution (Mw/Mn) | Number average degree of polymerization (DPn) | Weight average degree of polymerization (DPw) | CDI | Total sulfur content (mg/kg) |
|---|---|---|---|---|---|---|---|---|---|---|
| Cellulose acetate A | 1.7 | 44.8 | 0.42 | 39000 | 91000 | 2.3 | 165 | 386 | 4.08 | 50 |
| Cellulose acetate B | 2.04 | 49.4 | 0.34 | 49500 | 104000 | 2.1 | 200 | 420 | 3.66 | 54 |

TABLE 4-continued

| Type | Degree of acetyl substitution | Combined acetic acid (%) | Measured value of half-height width of compositional distribution | Number average molecular weight (Mn) | Weight average molecular weight (Mw) | Molecular weight distribution (Mw/Mn) | Number average degree of polymerization (DPn) | Weight average degree of polymerization (DPw) | CDI | Total sulfur content (mg/kg) |
|---|---|---|---|---|---|---|---|---|---|---|
| Cellulose acetate C | 1.77 | 45 | 0.74 | 28000 | 70000 | 2.5 | 120 | 296 | 6.35 | 162 |

As shown in Table 3, it is understood that, when a dispersion or solution of the glycerin ester-based plasticizer was used, a wholly transparent and uniform molded article was obtained without residual unmelted substances, as compared with the case where the cellulose acetate and the glycerin ester-based plasticizer were mixed directly. It is also understood that the cellulose acetate compositions of the Examples are less likely to be colored because of their low b value.

The invention claimed is:

1. A cellulose acetate composition for thermoforming, comprising a cellulose acetate and a glycerin ester-based plasticizer,
wherein the cellulose acetate has a degree of acetyl substitution of 1.4 or greater and 2.0 or less, a compositional distribution index (CDI) of 4.0 or less, and a total sulfur content of 15 mg/kg or greater and less than 150 mg/kg,
wherein CDI is defined as:

CDI=(Measured value of a half-height width of compositional distribution)/(Theoretical value of a half-height width of compositional distribution)

where
the measured value of a half-height width of compositional distribution is a half-height width of compositional distribution determined by HPLC analysis of cellulose acetate propionate obtained by propionylating all residual hydroxyl groups of cellulose acetate (sample); and the theoretical value of a half-height width of compositional distribution is obtained by:

Theoretical value of half-height width of compositional distribution = [Equation 1]

$$2.35482\sqrt{3*DPw*(DS/3)*(1\ DS/3)}/DPw$$

where
DS represents a degree of acetyl substitution; and
DPw represents a weight average degree of polymerization (a value determined by GPC-light scattering method using cellulose acetate propionate obtained by propionylating all residual hydroxyl groups of cellulose acetate (sample)).

2. The cellulose acetate composition for thermoforming according to claim 1, wherein a content of the glycerin ester-based plasticizer is 5 parts by weight or greater and 40 parts by weight or less, per 100 parts by weight of a total amount of the cellulose acetate and the glycerin ester-based plasticizer.

3. The cellulose acetate composition for thermoforming according to claim 1, wherein the glycerin ester-based plasticizer is an ester compound of glycerin and acetic acid.

4. The cellulose acetate composition for thermoforming according to claim 1, wherein the glycerin ester-based plasticizer is triacetin.

5. The cellulose acetate composition for thermoforming according to claim 1, wherein the cellulose acetate has a degree of acetyl substitution of 1.4 or greater and 1.8 or less.

6. A molded article formed by molding the cellulose acetate composition for thermoforming described in claim 1.

7. The molded article according to claim 6, wherein the molded article is a film.

8. The molded article according to claim 6, wherein the molded article has a hollow cylindrical shape.

9. The molded article according to claim 6, wherein the molded article is a cigarette member of a heated tobacco product.

10. The cellulose acetate composition for thermoforming according to claim 1, wherein the weight average degree of polymerization (DPw) of the cellulose acetate is in the range from 100 to 1000.

11. The cellulose acetate composition for thermoforming according to claim 1, wherein the molecular weight distribution Mw/Mn obtained by dividing the weight average molecular weight Mw by the number average molecular weight Mn of the cellulose acetate is 3.0 or less and 2.0 or greater.

12. A method for producing a cellulose acetate composition for thermoforming, comprising:
dispersing or dissolving a glycerin ester-based plasticizer in a dispersion medium or a solvent to prepare a dispersion or a solution;
mixing the dispersion or the solution with a cellulose acetate having a degree of acetyl substitution of 1.4 or greater and 2.0 or less; and
vaporizing the dispersion medium or the solvent from a mixture obtained by the mixing,
wherein the cellulose acetate has a degree of acetyl substitution of 1.4 or greater and 2.0 or less, a compositional distribution index (CDI) of 4.0 or less, and a total sulfur content of 15 mg/kg or greater and less than 150 mg/kg,
wherein CDI is defined as:

CDI=(Measured value of a half-height width of compositional distribution)/(Theoretical value of a half-height width of compositional distribution)

wherein
the measured value of a half-height width of compositional distribution is a half-height width of compositional distribution determined by HPLC analysis of cellulose acetate propionate obtained by propionylating all residual hydroxyl groups of cellulose acetate (sample); and the theoretical value of a half-height width of compositional distribution is defined by:

$$\text{Theoretical value of half-height width of compositional distribution} = 2.35482\sqrt{3 * DPw * (DS/3) * (1 - DS/3)}/DPw \quad \text{[Equation 2]}$$

where

DS represents a degree of acetyl substitution; and

DPw represents a weight average degree of polymerization (a value determined by GPC-light scattering method using cellulose acetate propionate obtained by propionylating all residual hydroxyl groups of cellulose acetate (sample)).

13. The method for producing a cellulose acetate composition for thermoforming according to claim 12, wherein the dispersion medium or the solvent is water, ethanol, or a mixed solution of water and ethanol.

14. The method for producing a cellulose acetate composition for thermoforming according to claim 12, wherein a content of the glycerin ester-based plasticizer is 5 parts by weight or greater and 40 parts by weight or less, per 100 parts by weight of a total amount of the cellulose acetate and the glycerin ester-based plasticizer.

15. The method for producing a cellulose acetate composition for thermoforming according to claim 12, wherein the cellulose acetate has a degree of acetyl substitution of 1.4 or greater and 1.8 or less.

16. The method for producing a cellulose acetate composition for thermoforming according to claim 12, wherein, after the step of vaporizing the dispersion medium or the solvent from the mixture obtained by the mixing, or at the same time as the step of vaporizing the dispersion medium or the solvent from the mixture obtained by the mixing, a melt-kneading is performed.

\* \* \* \* \*